(12) United States Patent
Sanger

(10) Patent No.: US 10,783,468 B2
(45) Date of Patent: Sep. 22, 2020

(54) WORKFORCE VIRTUALIZATION

(71) Applicant: Tele-Commuter Resources, Inc., Saint Paul, MN (US)

(72) Inventor: John Sanger, Shoreview, MN (US)

(73) Assignee: John Sanger, Shoreview, MN (US)

(*) Notice: Subject to any disclaimer, the term of this patent is extended or adjusted under 35 U.S.C. 154(b) by 1108 days.

(21) Appl. No.: 14/966,153

(22) Filed: Dec. 11, 2015

(65) Prior Publication Data

US 2016/0171425 A1 Jun. 16, 2016

Related U.S. Application Data

(60) Provisional application No. 62/090,649, filed on Dec. 11, 2014.

(51) Int. Cl.
*G06Q 10/06* (2012.01)
*G06Q 10/10* (2012.01)

(52) U.S. Cl.
CPC .. *G06Q 10/063118* (2013.01); *G06Q 10/0635* (2013.01); *G06Q 10/105* (2013.01)

(58) Field of Classification Search
CPC ....... G06Q 10/063118; G06Q 10/0635; G06Q 10/105
See application file for complete search history.

(56) References Cited

U.S. PATENT DOCUMENTS

| | | | | |
|---|---|---|---|---|
| 5,953,707 A | * | 9/1999 | Huang | G06Q 10/06 705/7.25 |
| 6,247,005 B1 | | 6/2001 | Edwards et al. | |
| 6,301,339 B1 | | 10/2001 | Staples et al. | |
| 7,162,427 B1 | | 1/2007 | Myrick et al. | |
| 7,698,248 B2 | * | 4/2010 | Olson | G06Q 10/06 706/56 |
| 2002/0198766 A1 | | 12/2002 | Magrino et al. | |
| 2003/0055665 A1 | | 3/2003 | Fleming | |
| 2003/0135599 A1 | | 7/2003 | Sanger | |
| 2004/0189701 A1 | | 9/2004 | Badt | |

(Continued)

OTHER PUBLICATIONS

Application and File History for U.S. Appl. No. 10/256,532, filed Sep. 27, 2002, inventor Sanger.

(Continued)

*Primary Examiner* — Nadja N Chong Cruz
(74) *Attorney, Agent, or Firm* — Patterson Thuente Pedersen, P.A.

(57) ABSTRACT

A system and method for developing and implementing a workforce virtualization program comprises six phases. A virtualization assessment and profiling process uses analytic methods to determine the feasibility of virtualizing some or all of an organization's workers. A mitigation assessment is conducted to identify cost-effective means of reducing barriers to virtualization. Scenario assessment and modeling phase allows an organization to develop an optimum virtualization scenario. A policy review and development phase allows an organization to develop virtualization policies, including business continuity plans. A virtualization implementation planning phase allows and organization to develop detailed plans for deployment of the virtualization scenario. A monitoring and refinement process allows an organization to track implementation of the deployment plans and modify as necessary.

20 Claims, 31 Drawing Sheets

(56) References Cited

U.S. PATENT DOCUMENTS

| | | | |
|---|---|---|---|
| 2008/0167919 A1* | 7/2008 | Clayton | G06Q 10/06 705/7.36 |
| 2009/0204471 A1* | 8/2009 | Elenbaas | G06Q 10/06 705/7.13 |
| 2011/0040695 A1* | 2/2011 | Wasicek | G06Q 10/06 705/320 |
| 2012/0130768 A1* | 5/2012 | Rajagopal | G06Q 10/06 705/7.25 |
| 2015/0012148 A1* | 1/2015 | Bhageria, Jr. | G06Q 10/06 700/295 |

OTHER PUBLICATIONS

Warren et al., "Framework for the assessment of feasibility of telecommuting in Australian organizations", Proceedings of the 28$^{th}$ Hawaii International Conference on System Sciences (Jan. 4-7, 1995) pp. 436-445.

Nilles et al., "Managing Telework: Strategies for Managing the Virtual Workforce", Wiley 1998, Chapters 1, 2, 5-7, 10. Appendix E.

Telework and the Environment. National Environment Policy Institute, Washington D.C., Dec. 1999.

Vega et al., "Managing Telecommuting in the Federal Government: A Interim Report", Jun. 2000.

* cited by examiner

FIG. 13

| SystemID | Issues | Method | Trend |
|---|---|---|---|
| COOP | | | ResponseTime |
| COOP | | | Performance |
| COOP | | | 14 |
| Evaluation | Co-worker Rapport | Peer Review | Relationships |
| Evaluation | Flexibility Code | Metrics | Balance |
| Evaluation | Productivity/Performance | Metrics | Performance |
| Evaluation | Appearance | Observation | Environment |
| Evaluation | Manager Relationships | Client Review | Relationships |
| Evaluation | Flexibility/Scheduling | Metrics | Availability |
| Evaluation | Recall Schedule | Metrics | Availability |
| Evaluation | Quality of Family Life | Goals | Balance |
| Evaluation | Attitude/Communications | Observation | Relationships |
| Evaluation | Corporate Involvement | Goals | Involvement |
| Evaluation | Tech Support | Metrics | Performance |
| Evaluation | Community Involvement | Goals | Involvement |
| Evaluation | Support Relationships | Peer Review | Relationships |
| Evaluation | Support Relationships | Peer Review | Relationships |
| Evaluation | Client Relationships | Client Review | Relationships |
| Evaluation | Peer Relationships | Peer Review | Relationships |
| Evaluation | Professional Networking | Peer Review | Relationships |
| Evaluation | Quality of Personal Time | Peer Review | Balance |
| Evaluation | Compared to Last Eval | Metrics | Performance |
| Evaluation | Teamwork Effectiveness | Peer Review | Relationships |
| Evaluation | Co-Worker-Reliance | Observation | Relationships |
| Evaluation | Meets Objectives | Metrics | Performance |
| Evaluation | Compared to On-Site Peers | Peer Review | Performance |
| Inspection | Insurance Rider | Metrics | Safety |
| Inspection | Electrical Supply | Metrics | Configurations |
| Inspection | Ergonomics | Metrics | Safety |
| Inspection | Custody Audit | Metrics | Configurations |
| Inspection | Home Environment | Observation | Environment |
| Inspection | Safety | Metrics | Safety |
| Management | | | System Ops |
| Management | | | Equipment Ops |
| Management | | | Clarity of Issue |
| Supported | | | Competency |

WORKFORCE VIRTUALIZATION

RELATED APPLICATIONS

The present application claims the benefit of U.S. Provisional Application No. 62/090,649 filed Dec. 11, 2014, which is hereby incorporated herein in its entirety by reference. The present application is related to U.S. Patent Application Publication No. 2003/0135599 A1 (U.S. application Ser. No. 10/256,532) filed Sep. 27, 2002, incorporated herein in its entirety.

TECHNICAL FIELD

The present disclosure is related to the field of consulting systems, specifically consulting systems for assisting organizations in implementing virtualization programs.

BACKGROUND

It may be beneficial for many organizations to allow for some or their entire workforce to work remotely (also known as telecommuting or virtualization). In theory, workforce virtualization can provide many benefits to organizations, workers, and communities. Such benefits include reduced facilities costs, reduced absenteeism, less time lost to commuting, fewer miles driven, and a reduction in road congestion.

In practice, however, many of these benefits are not fully realized because organizations are unable to analyze the costs and benefits of deploying employees to work remotely. As such, many organizations only implement telecommuting in an ad hoc fashion, allowing some employees to work remotely on days of their choosing. This strategy fails to capture the full benefits of a virtualization program because organizations must maintain work stations on-site for these casual telecommuters, and in many cases have duplicate costs for equipment. Therefore, a need exists for an improved workforce virtualization program, and methods and system capable of assisting organizations in implementation.

An early attempt to advance virtualization techniques is described in U.S. Patent Application Publication No. 2003/0135599A1, filed on Sep. 27, 2002 by Sanger.

SUMMARY

Embodiments of the present application substantially address or meet the aforementioned needs of the industry. In an embodiment, a system and method for developing and implementing a workforce virtualization program comprises six phases. A virtualization assessment and profiling process uses analytic methods to determine the feasibility of virtualizing some or all of an organization's workers. A mitigation assessment is conducted to identify cost-effective means of reducing barriers to virtualization. A scenario assessment and modeling phase allows an organization to identify an optimum virtualization plan. A policy review and development phase allows an organization to develop virtualization policies, including business continuity plans. A virtualization implementation planning phase allows an organization to develop detailed plans for deployment of the virtualization plan. A monitoring and refinement process allows an organization to track implementation of the deployment plans, research comparatives against comparable organizations and modify as necessary.

In an embodiment, an enterprise software package incorporates a strategic plan that sequentially converts space and deploys a specific number of individuals in a specific job class over time based upon a deployment plan. It is done in a way that allows the deployed workers to totally and automatically support operations in case there is a major catastrophe through an integrated continuity of operations/disaster recovery plan.

In an embodiment, a system for workforce virtualization planning for an organization comprises a computing platform including computing hardware of at least one processor, data storage, an operating system implemented on the computing hardware, a display interface, and input/output facilities; instructions that, when executed on the computing platform, cause the computing platform to implement a user interface configured to present workforce virtualization planning data to a user via the display interface of the computing hardware, a schedule tracking module configured to monitor completeness of a workforce virtualization plan, a planning module configured to present, using the user interface, a plurality of phases of the workforce virtualization plan as monitored by the schedule tracking module, an enterprise resource planning (ERP) interface configured to interface to a traditional ERP system maintained by the organization, the traditional ERP system including organizational data, a location module configured to provide geographic information system (GIS) data from a GIS server, a job information module configured to provide job class data and job hierarchy data, a modeling module configured to model a proposed deployment plan against one or more scenarios, and a competitive intelligence module configured to aggregate and process the organizational data, the GIS data, the job class data, the job hierarchy data, and the modeled proposed deployment plan to generate a workforce virtualization plan, wherein after implementation of the workforce virtualization plan, the competitive intelligence module is further configured to receive and evaluate a plurality of inputs to the input/output facilities related to the workforce virtualization plan and update the workforce virtualization plan.

In another embodiment, a machine-implemented method for business continuity planning for an organization with a computer system, the computing system including computing hardware of at least one processor, data storage, an operating system implemented on the computing hardware, a display interface, and input/output facilities, the method being executed by the computer system comprises executing a geographic information system (GIS) server configured to provide location data; identifying a plurality of threats to business continuity to the organization using at least the location data to identify an impact area relative to worker locations for each of the plurality of threats; ordering the plurality of threats according to the highest risk to business continuity to the organization, wherein the ordering is conducted automatically by the computing hardware according to at least a number of organizational facilities impacted by the threat, a number of workers impacted by the threat, an impact cost of the threat, and a probability of the threat occurring; generating a response plan to at least one of the ordered plurality of threats, wherein the response plan includes computing equipment needs for a plurality of worker profiles; and deploying computing equipment resources according to the computing equipment needs for each of the workers matching the plurality of worker profiles.

In another embodiment, a machine-implemented method for determining resources for a facility with a computer system, the computing system including computing hardware of at least one processor, data storage, an operating system implemented on the computing hardware, a display interface, and input/output facilities, the method being executed by the computer system, comprises conducting a space inventory with the computing system, wherein the space inventory returns currently available space for the facility; conducting an equipment inventory with the computing system, wherein the equipment inventor returns currently available computing resources; conducting a job class analysis for a plurality of job classes with the computing system, wherein the job class analysis returns at least one computing resource requirement and at least one space resource requirement; determining a compatibility area profile with the computing system, the compatibility area profile returning an optimized staffing level according to the currently available space for the facility, the currently available computing resources, the at least one computing resource requirement, and the at least one space resource requirement; and deploying at least one worker with the at least one computing resource requirement according to the compatibility area profile.

The above summary is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments in connection with the accompanying drawings, in which:

FIG. 13 is a screenshot of an alternative scenario modeling user interface, according to an embodiment.

FIG. 16 is a table of evaluation issues, evaluation methods for the evaluation issue, and trends for the evaluation issue in a policy review and development phase, according to an embodiment.

FIG. 29 is a screen shot of a menu in user interface facilitating a policy review and development process, according to an embodiment.

Figure 1:
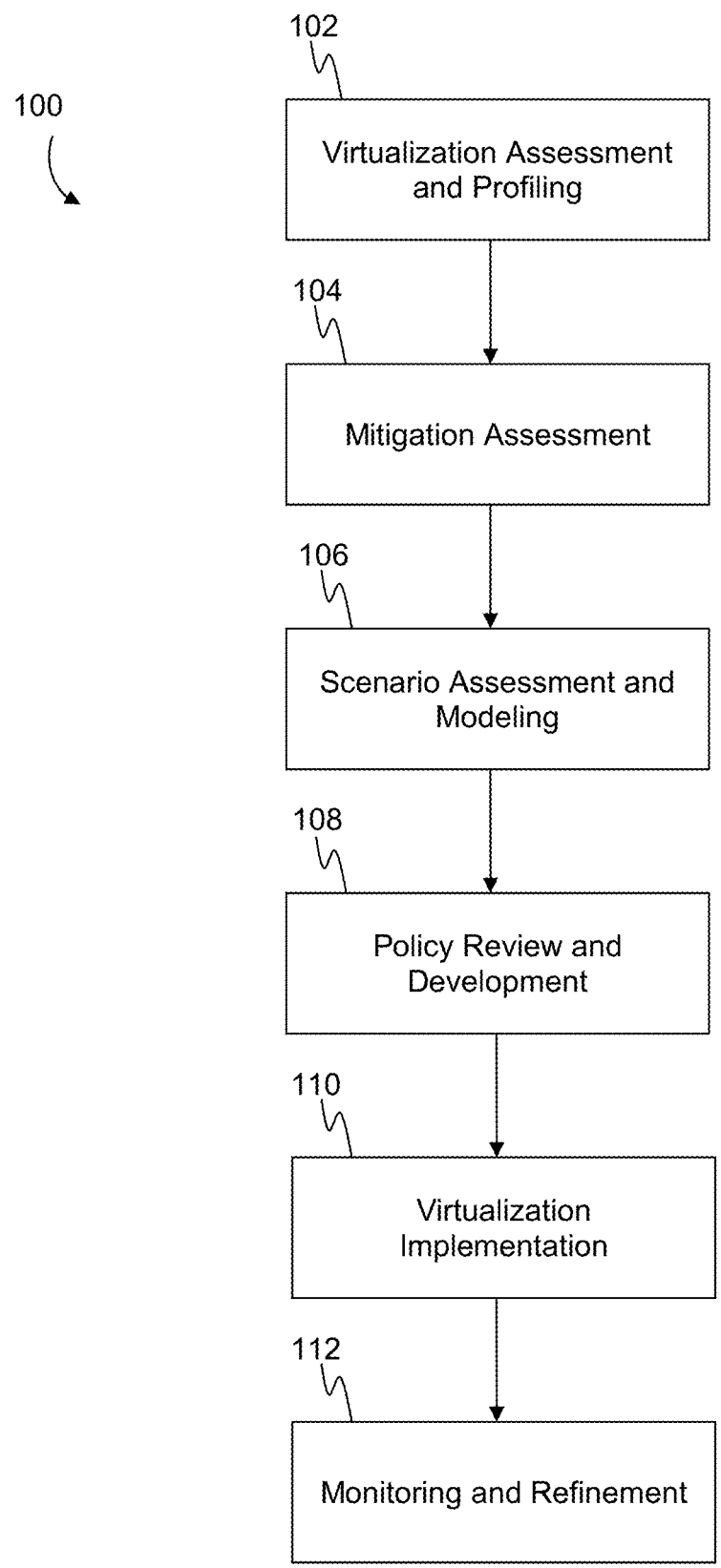
FIG. 1 is a flow diagram depicting the phases of a workforce virtualization program, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIG. 1, a workforce virtualization program can comprise six phases, each phase comprising one or more tasks. A virtualization assessment and profiling process phase 102 can determine whether it is feasible for an organization to implement a workforce virtualization project. A mitigation investment analysis phase 104 can determine mitigations to be implemented in order to reduce barriers to virtualization. A scenario assessment and modeling phase 106 can evaluate alternative scenarios in order to determine an optimal deployment plan. A policy review and development phase 108 can modify or create organizational policies in order to support the optimal deployment plan. A virtualization implementation process phase 110 can execute the deployment plan. Finally, a monitoring and refinement phase 112 can track actual performance against the deployment plan and modify the plan or policies as needed.

In an embodiment, the results of the virtualization assessment and profiling phase 102 are subjected to mitigation assessment phase 104. In an embodiment, the results of the mitigation assessment phase 104 are utilized in scenario assessment and modeling phase 106. The resulting scenario is applied in policy review and development phase 108. In an embodiment, the scenario as applied by policy review and development phase 108 is utilized in virtualization implementation plan 110. Finally, monitoring and refinement 112 is applied.

Figure 2:
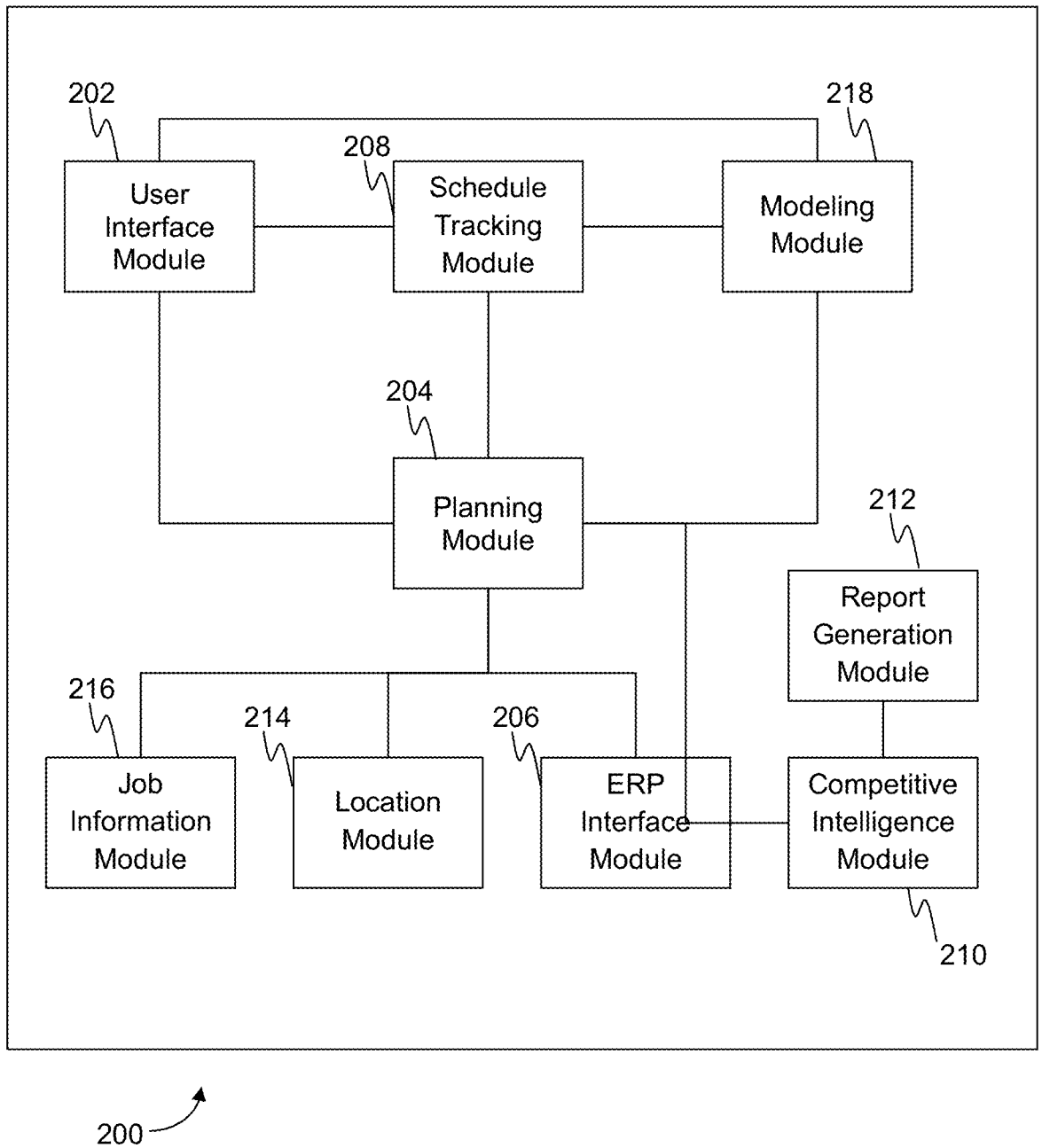
FIG. 2 is a block diagram of a system configured to store data and guide the user through a workforce virtualization program, according to an embodiment.

Referring now to FIG. 2, in an embodiment, a virtualization system 200 is configured to facilitate execution of the phases of workforce virtualization program 100. Virtualization system 200 can comprise hardware, software, or a combination thereof. In an embodiment, virtualization system 200 comprises a user interface 202, a workforce virtualization program planning module 204, an enterprise resource planning (ERP) system interface module 206, a schedule tracking module 208, a competitive intelligence tracking module 210, a report generation module 212, a location module 214, a job information module 216, and a modeling module 218. One skilled in the art will appreciate that any number of module configurations are possible. FIG. 2 depicts one configuration, in which virtualization system 200 utilizes planning module 204 as a central communication hub between, for example, user interface module 202, schedule tracking module 208, and modeling module and job information module 216, location module 214, ERP interface module, and competitive intelligence module 210. Other configurations and operable couplings are of course considered, as virtualization system 200 of FIG. 2 is merely one embodiment provided only by way of example.

In an embodiment, virtualization system 200 can be separately instantiated for each organization performing workforce virtualization program 100. In another embodiment, virtualization system 200 can be configured to store and manage information for multiple organizations simultaneously.

User interface 202 can comprise any user interface module, system, or series of modules and systems configured to present data to one or more users and receive inputs from one or more users. Example user interfaces can include web-based forms, Microsoft Project forms, Microsoft Access forms, or native applications for personal computers, smart phones, or tablets. User interface 202 can provide administration, planning, evaluation and/or other interfaces as needed in order to interface with or facilitate workforce virtualization program 100. In an embodiment, user interface 202 can use data provided by schedule tracking module 208 in order to dynamically present the one or more users with interfaces customized to how much of the workforce virtualization program 100 has been completed. FIGS. 27-31 depict exemplary menus that can be presented by user interface 202, allowing a user to access one or more screens.

Planning module 204 can comprise data storage and software configured to allow one or more users to plan, perform, and track the steps of workforce virtualization program 100. Planning module 204 can store data for one or more organizations as well as individual groups within a given organization.

ERP system interface module 206 can provide an operable connection between planning module 204 and an organization's existing ERP systems. Organizations often collect information that is relevant to the workforce virtualzation program 100 in ERP systems such as SAP, Peoplesoft, or JFire. Other databases or collection systems can of course be used. Such information can include organizational structure, organization specific job classes, human resources data (such as employee locations), procurement data such as approved supplier lists, and organizational policies and procedures. ERP system interface module 206 allows a user to access, set, modify, or otherwise read or write configuration information for one or more ERP systems. Configuration information can include access and authentication details, schema details including which fields in the ERP system map to data fields within the planning module 204, and synchronization schedules, for example. Other fields, additional fields, or fewer fields can likewise be utilized in embodiments.

Schedule tracking module 208 is configured to allow an organization or individuals to track progress towards completion of the workforce virtualzation program 100. Further, in embodiments, schedule tracking module 208 can allow a user to mark steps within the various phases of the workforce virtualization program 100 according to a level of completeness. In one embodiment, schedule tracking module 208 can track a completion percentage for each task. In another embodiment, tasks can be marked as "done" or "not done." Planning module 204 can use the data from schedule tracking module 208 to control which tasks or phases of the workforce virtualization program 100 are shown to a user for completion.

Competitive intelligence module 210 can track data entered into other modules of the workforce virtualization system 200 in aggregate form in order to provide process benchmarks across organizations. At each phase and task of the workforce virtualization program 100, data can be anonymized and stored. For example, in one embodiment, competitive intelligence module 210 can track or otherwise determine the number of employees in each organization that work remotely for a given number of days prior to program implementation. For example, competitive intelligence module 210 is configured to determine the number of managers in each organization that work remotely three or more days per week. In other embodiments, competitive intelligence module 210 is configured to anonymized data such that private information can be shared between organizations. For example, organizations might be hesitant (or it may be illegal) to share employee data with other organizations. However, competitive intelligence module 210 can aggregate data from two or more organizations such that a disaster plan or congestion mitigation plan can be developed by a larger entity.

Report generation module 212 can provide statistical data based on the data aggregated by the competitive intelligence module 210. In embodiments, report generation module 212 is configured to provide ad-hoc, recurring, scheduled, or other reports based on the data aggregated by competitive intelligence module 210. In embodiments, report generation module 212 is configured to provide aggregated reports. In other embodiments, report generation module 212 is configured to provide raw statistical data.

Location module 214 can provide cartographical and other geographic information system (GIS) data from the North American Cartographical Information Society (NACIS), National Weather Service or other sources. The cartographical data can be stored locally, accessed remotely when needed, and/or periodically synchronized. In other embodiments, location module 214 can comprise a discrete database comprising data separate from GIS data. In embodiments, location module 214 can be populated independently of GIS data or in combination with GIS data.

Job information module 216 can provide data from the Standard Occupational Classification System (SOCS), and the ERP system interface 206 and other sources regarding the job classes and hierarchy present within an organization. In embodiments, job information module 216 can be populated independently of SOCS data or ERP system interface data or in combination with SOCS data or ERP system interface data. Job information module 216 can further provide data from North American Industry Classification System (NAICS) databases. NAICS is the standard used by Federal statistical agencies in classifying business establishments for the purpose of collecting, analyzing, and publishing statistical data related to the U.S. business economy.

Modeling module 218 can comprise data and processes to allow a user to compare multiple scenarios in order to complete scenario assessment modeling phase 12. In embodiments, modeling module 218 can be configured with predefined modules for scenario comparisons. In embodiments, modules can be developed or defined within modeling module 218 according to a particular organizational requirements or individual requirements. Modeling module 218 can be operably coupled to planning module 204, location module 214, and job information module 216.

Virtualization systems can be implemented in a number of different embodiments. For example, referring to FIG. 3, a virtualization system 300 is depicted, according to an embodiment. Virtualization system 300 is substantially similar to virtualization system 200. Virtualization system 300 generally includes a cloud-based processing engine 302 and a user interface 304. While virtualization system 300 is described herein with respect to a cloud-based system, embodiments of the invention can be performed in a cloud computing, client-server, or standalone computer processing environment, or any combination thereof.

Figure 4:
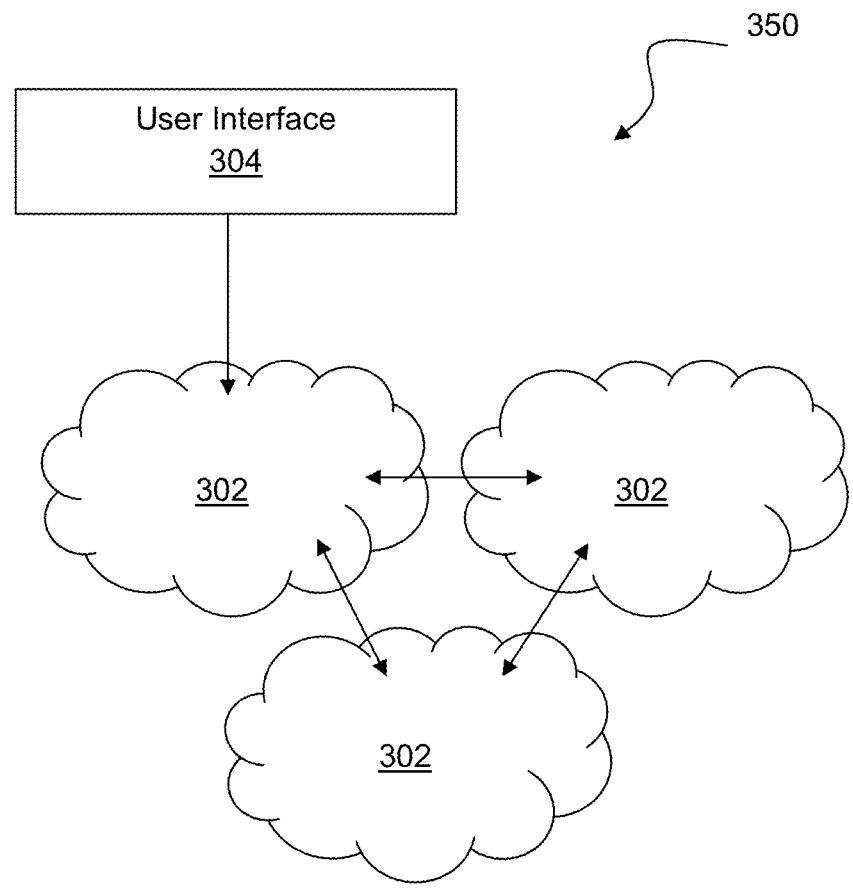
FIG. 4 is a block diagram of a system implemented by multiple cloud servers, according to an embodiment.

In an embodiment, cloud-based processing engine 302 generally includes server 306 and database 308. Cloud-based processing engine 302 embodies the computation, software, data access, and storage services that are provided to users over a network. For example, processing engine 302 can comprise one or more modules included in virtualization system 200, as depicted in FIG. 2. The components of cloud-based processing engine 302 can be located in a singular "cloud" or network, or spread among many clouds or networks, as depicted in FIG. 4. End-user knowledge of the physical location and configuration of components of cloud-based processing engine 302 is not required.

Server 306 generally includes processor 310 and memory 312. Processor 310 can be any programmable device that accepts digital data as input, is configured to process the input according to instructions or algorithms, and provides results as outputs. In an embodiment, processor 310 can be a central processing unit (CPU) configured to carry out the instructions of a computer program. Processor 310 is therefore configured to perform basic arithmetical, logical, and input/output operations.

Memory 312 can comprise volatile or non-volatile memory as required by the coupled processor 310 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Figure 3:
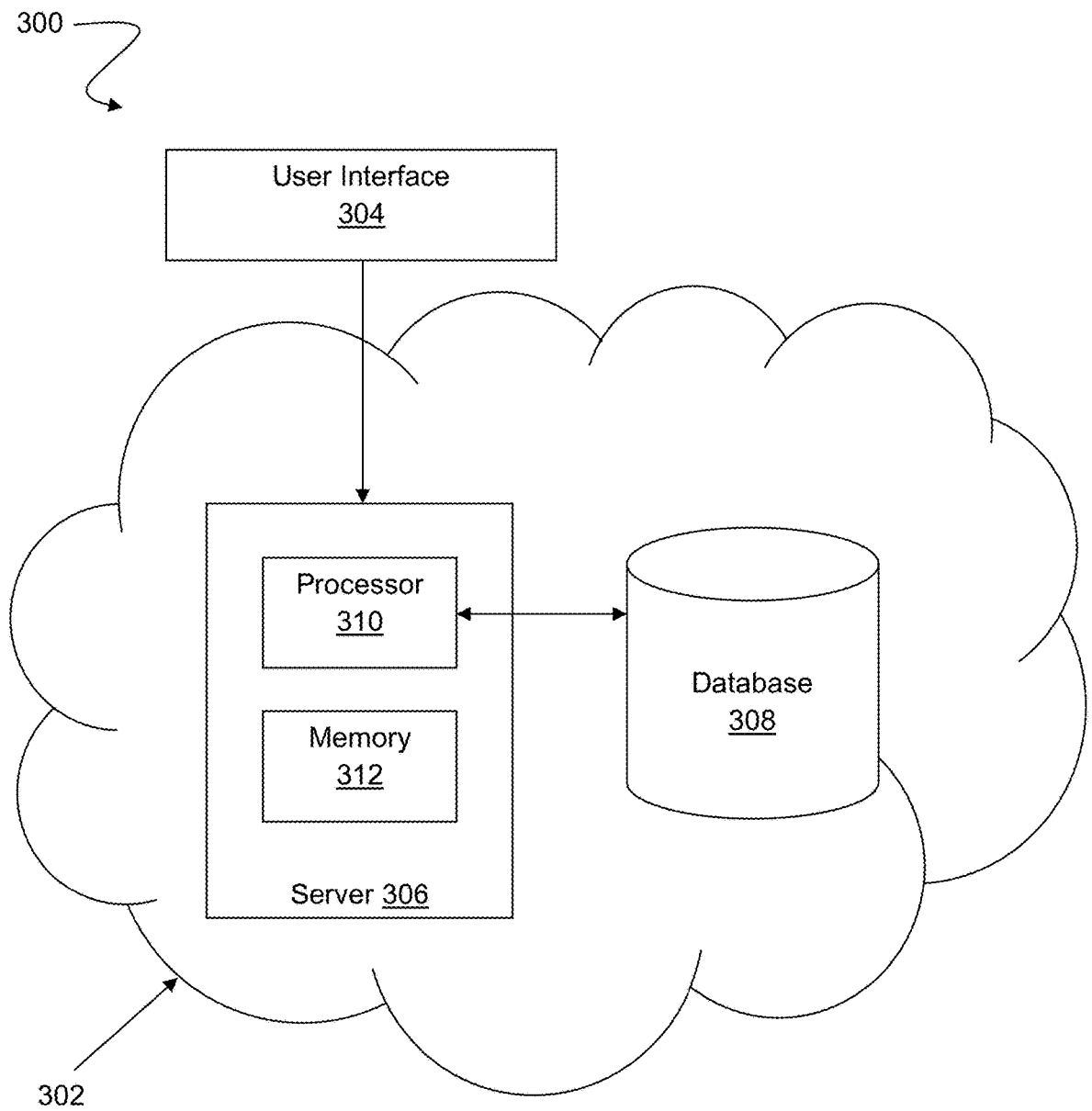
FIG. 3 is a block diagram of a system implemented by a single cloud server, according to an embodiment.

As depicted in FIG. 3, server 306 interfaces with database 308 via processor 310. Specifically, processor 310 can execute database-specific calls to store and retrieve data from database 308. Database 308 is can comprise any organized collection of data. In embodiments, database 308 can comprise simple non-volatile memory as part of a computer. In embodiments, database 308 can comprise database management systems such as Oracle, IBM DB2, or Microsoft SQL Server, for example. In embodiments, database 308 actually comprises a plurality of databases.

As shown in FIG. 3, database 308 is discrete from server 306. In another embodiment, database 308 is a part of server 306. In other embodiments, referring to FIG. 4, database 308 can be accessed as part of a separate cloud-based processing engine 302. Components of cloud-based processing engine 302 can therefore be spread among multiple cloud-based processing engines 302. For example, and referring to virtualization system 350, server 302 can be spread among many cloud-based processing engines 302. Database 308 can reside on a first cloud-based processing engine 302, while processor 310 and memory 312 reside on a second cloud-based processing engine 302. Or, processor 310 can reside on a first cloud-based processing engine 302, memory 312 can reside on a second cloud-based processing engine 302, and database 308 can reside on a third cloud-based processing engine 302. Any number of permutations where components are spread among a plurality of clouds are considered.

Likewise, virtualization system 350 can also comprise a plurality of servers 306 and databases 308. User interface 304 can be configured to access a first cloud-based processing engine 302, and the processing, storage, and presentation of data can be configured to be spread among second and third cloud-based processing engines 302 which are coupled to the other cloud-based processing engines 302, for example. Virtualization systems 300 and 350 are depicted in FIGS. 3 and 4, respectively, for simplicity only by way of example and are not intended to limit the scope of the invention.

Figure 5:
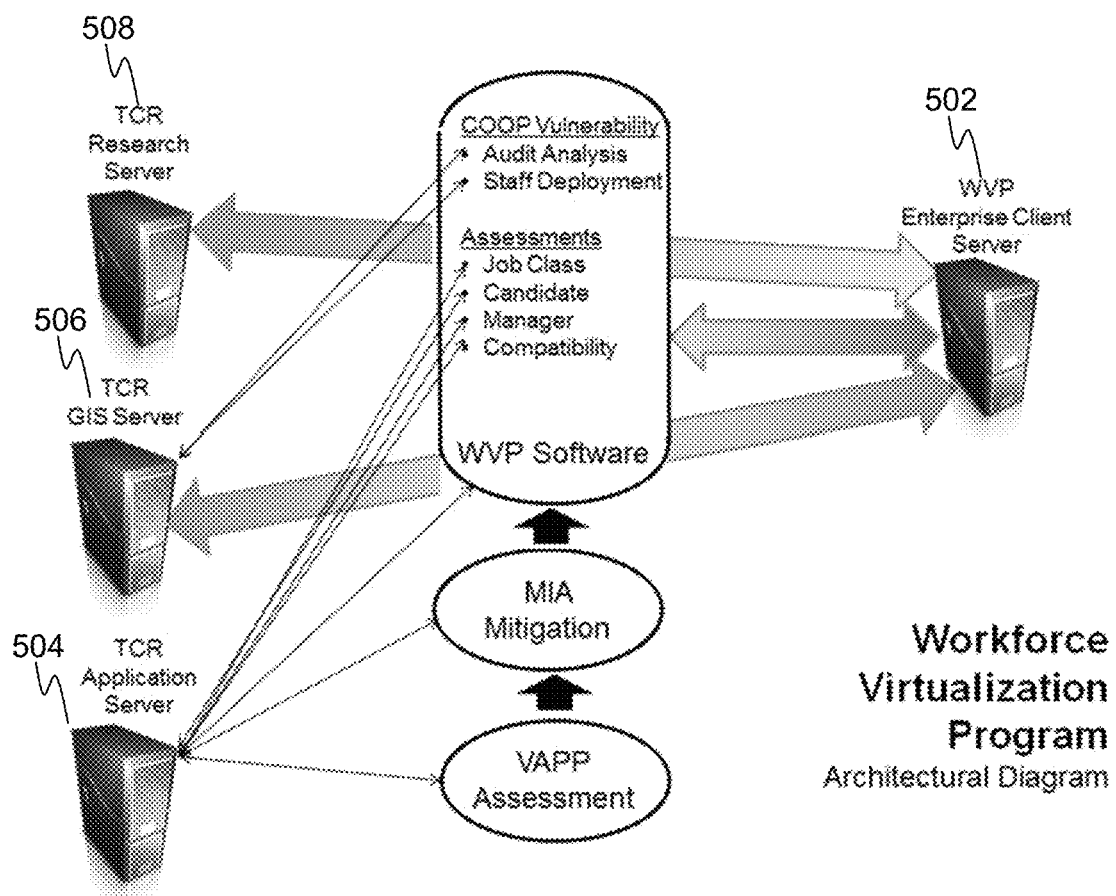
FIG. 5 is an architectural diagram of a system implemented by multiple servers, according to an embodiment.

FIG. 5 depicts an exemplary architecture according to one embodiment. The functionality of the virtualization system 200 components can be distributed across an number of different servers. Enterprise client server 502 can provide support for user interface module 202. Application server 504 can provide support for planning module 204, ERP system interface module 206, schedule tracking module 208, job information module 216, and modeling module 218. GIS server 506 can provide support for location module 214. Research server 508 can provide support for competitive intelligence tracking module 210 and report generation module 212. Other allocations of modules between servers 502, 504, 506, and 508 are also possible, and embodiments can include more or fewer servers than depicted. Servers 502, 504, 506, and 508 can comprise one or more processors, memory, and storage (including databases). The servers can be located locally, or as part of one or more cloud-based processing engines (as discussed above).

Phase 1

Figure 6:
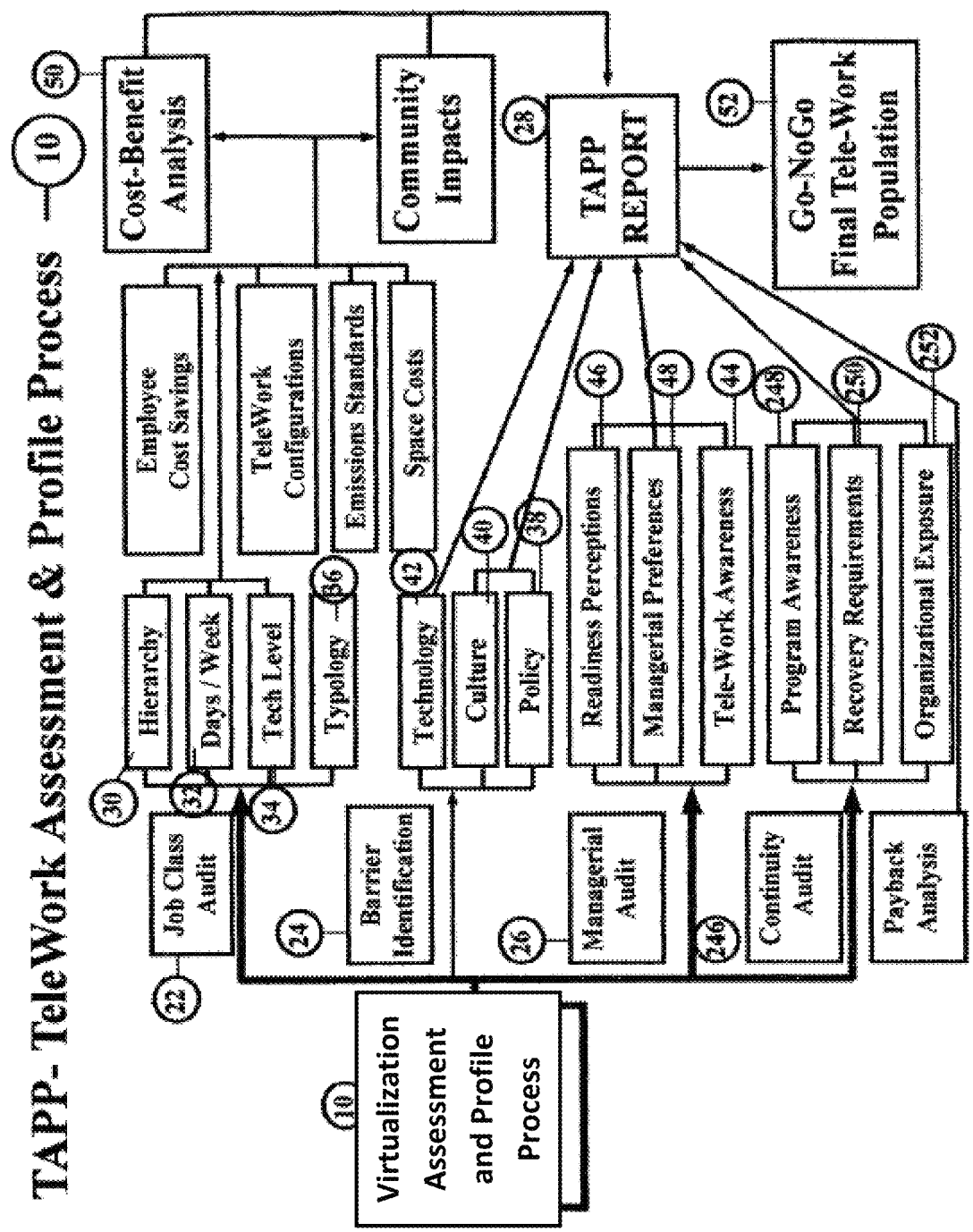
FIG. 6 is a block diagram of a virtualization assessment and profile process, according to an embodiment.

Referring to FIG. 6, a virtualization assessment and profiling process 10 can determine whether it is feasible for an organization, or one or more groups within an organization, to implement a workforce virtualization project. In an embodiment, virtualization assessment and profiling process 10 is substantially similar to virtualization assessment and profiling phase 102 as shown in FIG. 1. The virtualization assessment and profiling process 10 can comprise tasks such as a job class audit 22, barrier identification 24, managerial audit 26, facility audit (not shown), and a continuity audit 246.

User interface 202 can allow users to define one or more groups within the organization, and to perform each of the profiling process 10 tasks for each group. Group definitions can include data items such as location, organizational class, community type, industry classification, geographic scope, virtualization goals, transit cost data, and travel demand. These group definitions can be stored in the competitive intelligence module 210. As each task progresses, user interface 208 allow users to enter the current progress, which can be stored in schedule tracking module 208.

During job class audit 22, planning module 204 can gather data regarding standardized job classes from job information module 216 and, if available, data regarding the employees in each job class from an organization's ERP system via ERP interface 206. In addition, user interface 202 can allow users to enter job class data manually. Job class data gathered can include the relationship between levels in a job class hierarchy, and for each job class: the number of individuals employed, the number of individuals already deployed, the average salary, the cost of training and recruitment, the annual turnover rate and absenteeism levels, the annual rate of employment growth, and the type of space in which the work is done, the type and level of equipment needed. This allows planning module 204 to classify each job class for their potential for deployment.

During facility audit, planning module 204 can gather data regarding the facilities of an organization. Data can be gathered from one or more users, via the ERP interface 206, or both. Facility data can include facility name, type of spaces within each facility, square feet per workspace, square feet of common space per work space, cost per square foot, construction cost per square foot, and which job classes are assigned to which type of workspace.

During continuity audit 246, planning module 204 can gather data regarding an organization or group's disaster preparation needs and readiness. Data gathered can include the lowest level of working environment required to support restoration of each job class (for example, can a job class be performed at home, or are on-site facilities required), the period of time beyond which the organization or group will be adversely effected by lack of performance of the job class, and the current level of awareness of the status or existence of any continuity of operations (COOP) plan.

During barrier identification 24, specific barriers to virtualization deployment such as policy barriers, cultural barriers, or technological barriers is gathered by planning module 204.

During managerial audit 26, planning module 204 gathers data from management job classes regarding their attitude towards virtualization, the perception of readiness of job classes, and their views of the relevance of virtualization to themselves, the organization, and the community at large.

Planning module 204 can produce a virtualization assessment and profile process report 28, utilizing data entered during profiling process 10. Profile process report 28 can include the calculation of job class/employee deployment potential, supervisory and evaluation issues, readiness concerns, estimated costs of implementation and COOP awareness and a list of COOP activities and their time sensitivity. It can also identify barriers that limit additional deployment levels. Profile process report 28 can help the organization make a "go-nogo" decision regarding continuing with the workforce virtualization program. The profile process report 28 can be generated iteratively and updated as new data is provided to planning module 204.

Figure 7:
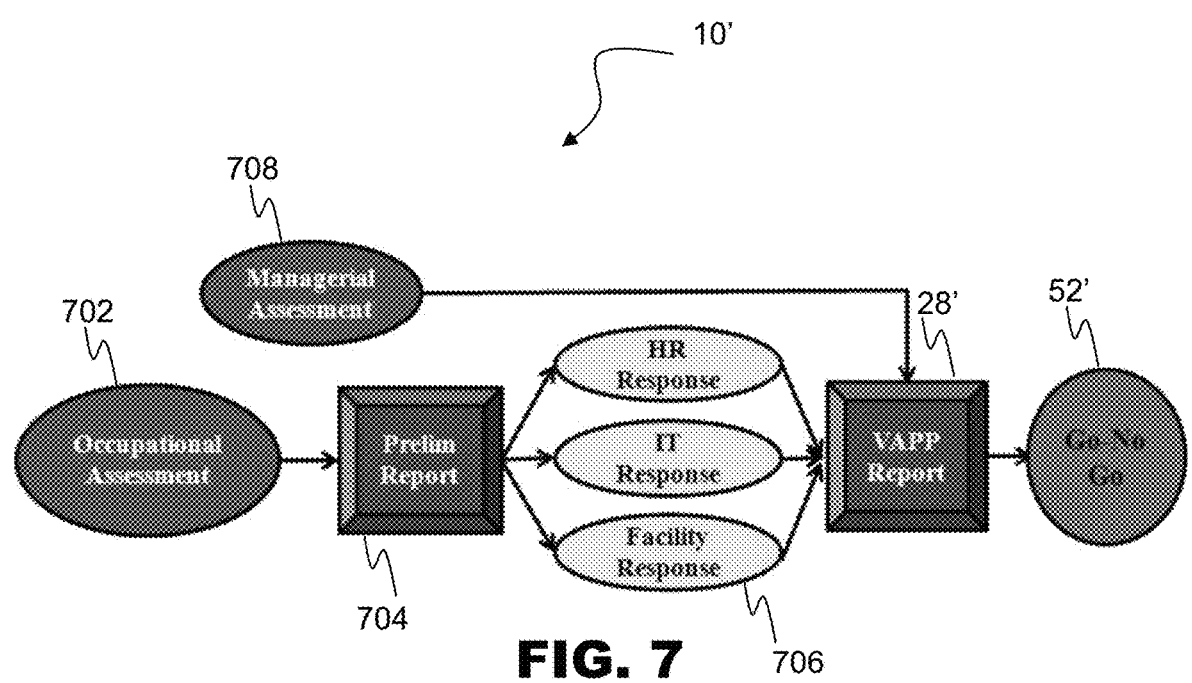
FIG. 7 is a block diagram of an alternative virtualization assessment and profile process, according to an embodiment.
Figure 8:
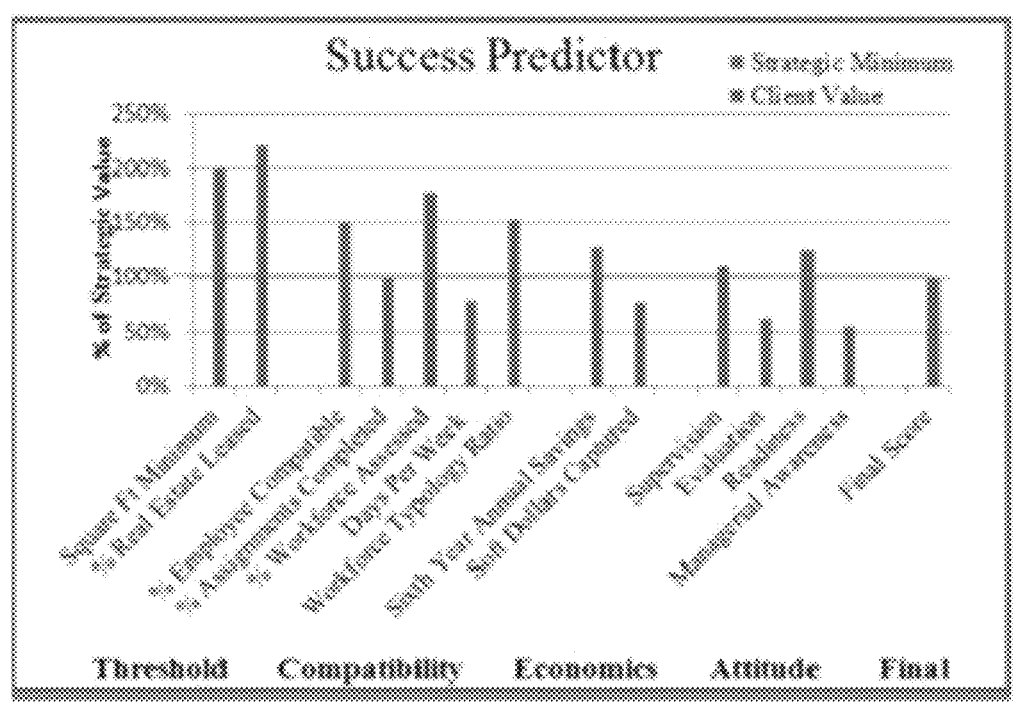
FIG. 8 is a screen shot of an example chart that can be produced during a virtualization assessment and profile process, according to an embodiment.

Referring to FIG. 7, an alternative profiling process 10' is depicted. Occupational assessment 702 which can comprise job class audit 22 and barrier identification 24 provides input to a preliminary report 704. Functional area responses 706 can be collected from functional areas such as human resources, information technology, facilities, or other functional areas that are desired by the organization. Functional area responses 706 can be combined with managerial assessment 708 in order to produce profile process report 28', which can be used to make a "go-nogo" decision 52'. FIG. 8 depicts an exemplary chart that can be included in profile progress report 28 or 28'.

Phase 2

Figure 9:
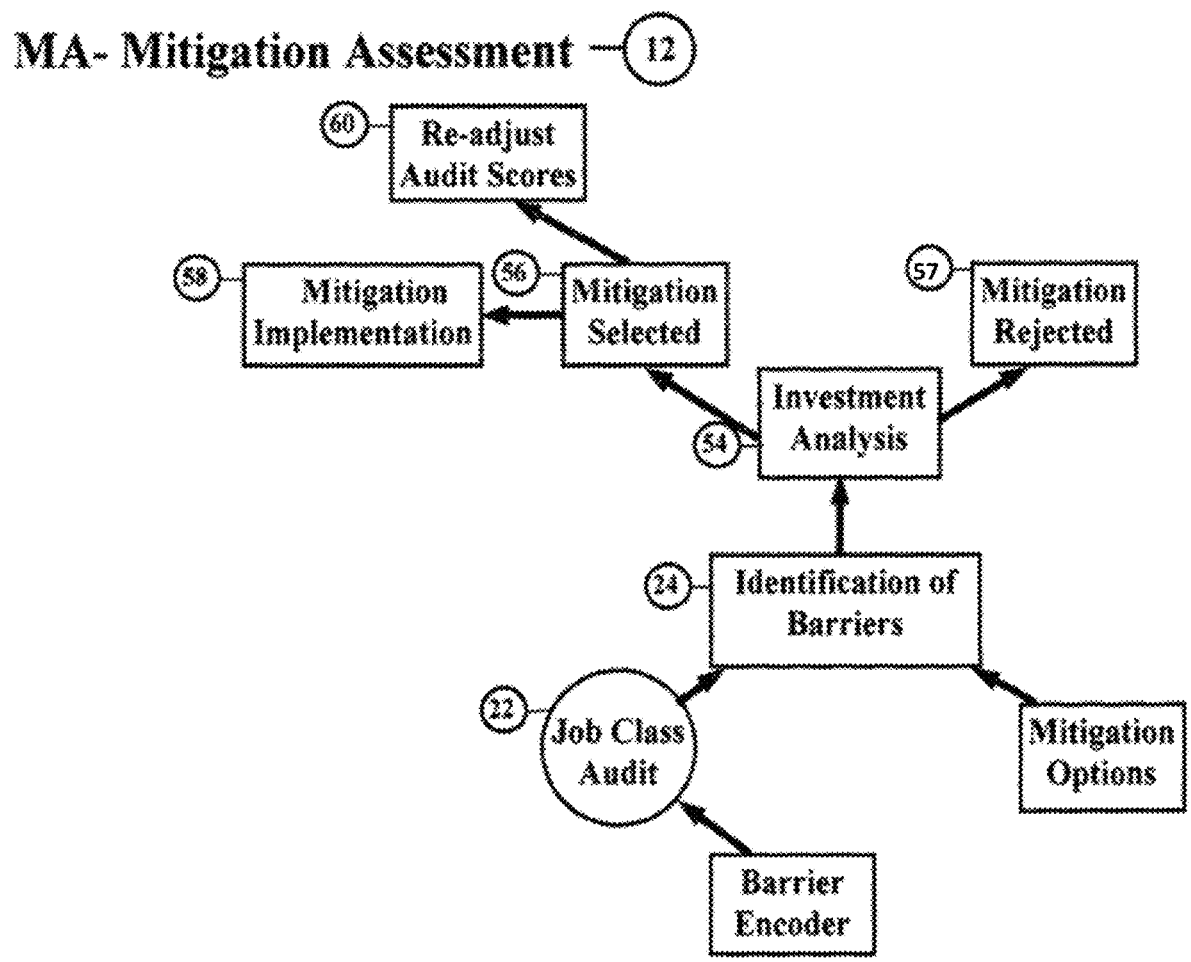
FIG. 9 is a block diagram of a mitigation assessment process, according to an embodiment.

Referring to FIG. 9, a mitigation investment analysis phase 12 is depicted. In an embodiment, mitigation investment analysis phase 12 is substantially similar to mitigation assessment phase 104 as shown in FIG. 1. Mitigation investment analysis phase 12 can allow an organization to expand the number of potential virtual workers by performing cost-benefit evaluations (investment analysis 54) of each of the barriers identified in the job class audit 22 to determine which mitigations may be appropriate. Mitigation investment analysis phase 12 can comprise tasks such as identification of barriers 24, investment analysis 54, mitigation selection 56, mitigation rejection 57, mitigation implementation 58, score adjustment 60.

During identification of barriers 24, user interface 202 can present the user with a list of barriers previously identified. User interface 202 can also allow the user to enter more barriers. Each barrier can be associated with data items such as barrier name, barrier type, and number of affected workers. During investment analysis 54 the user can provide mitigation options. Each mitigation option can include data items such as mitigation name, mitigation type, mitigation cost, and number of workers mitigated. By comparing a mitigation cost to the number of workers mitigated for each mitigation, a cost-analysis can be performed. In an embodiment, planning module 206 can calculate cost-benefits. In another embodiment, cost-benefits or particular costs are provided by the user. The user can then select 56 which mitigations to implement 58.

During mitigation implementation 58, the user can update the schedule tracking module 208 to create tasks for each mitigation to be implemented. Mitigations can be implemented before, during, or after virtualization implementation process 18. Based on the mitigations selected, planning module 206 can update 60 the profile process report 28 with new forecasts regarding total number of deployable workers in each job class.

Figure 27:
FIG. 27 is a screen shot of a menu in user interface facilitating a mitigation assessment process, according to an embodiment.

FIG. 27 depicts menu options that can be presented by user interface 202 in order to facilitate mitigation investment analysis phase 12.

Phase 3

Figure 10:
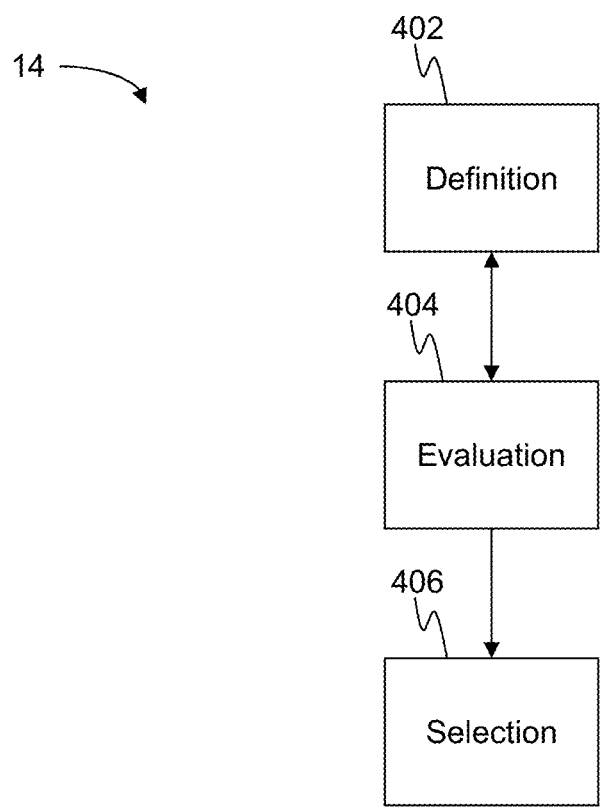
FIG. 10 is a block diagram of a scenario assessment and modeling phase, according to an embodiment.

Referring to FIG. 10, scenario assessment and modeling phase 14 can allow the user to develop alternative scenarios for a final virtualization implementation plan that best meets the business needs of the organization. In an embodiment, scenario assessment and modeling phase 14 is substantially similar to scenario assessment and modeling phase 106 as shown in FIG. 1. Modeling phase 14 can comprise tasks such as scenario definition 402, scenario evaluation 404, and scenario selection 406. Scenario definition 402 and scenario evaluation 404 can be iterated as necessary until a master scenario that meets the organizations goals is selected 406. In an embodiment, scenario assessment and modeling phase 14 provides the economic logic for moving forward with virtualization assessment and profiling process 10. In an embodiment, a report lists selection criteria, alternate scenarios that have been saved, and a checkbox or other selection indication depicting the scenario or selection criteria selected.

Figure 11:
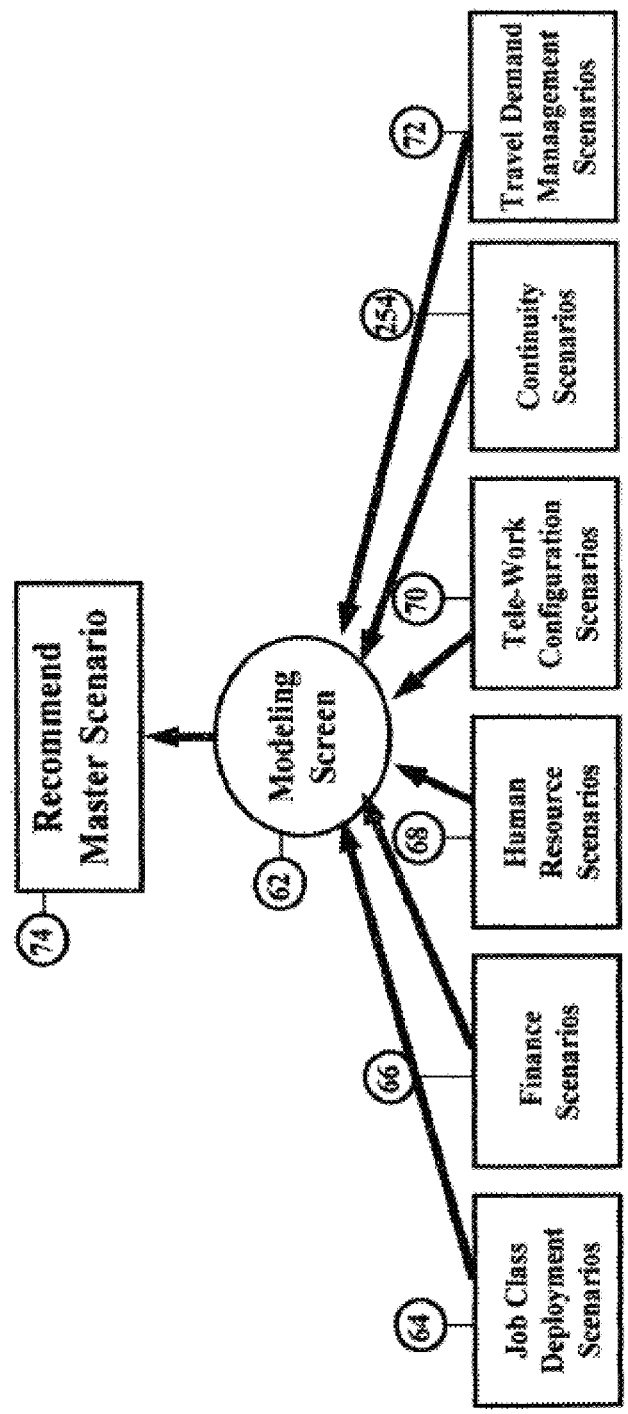
FIG. 11 is a block diagram of various component scenarios, according to an embodiment.
Figure 12:
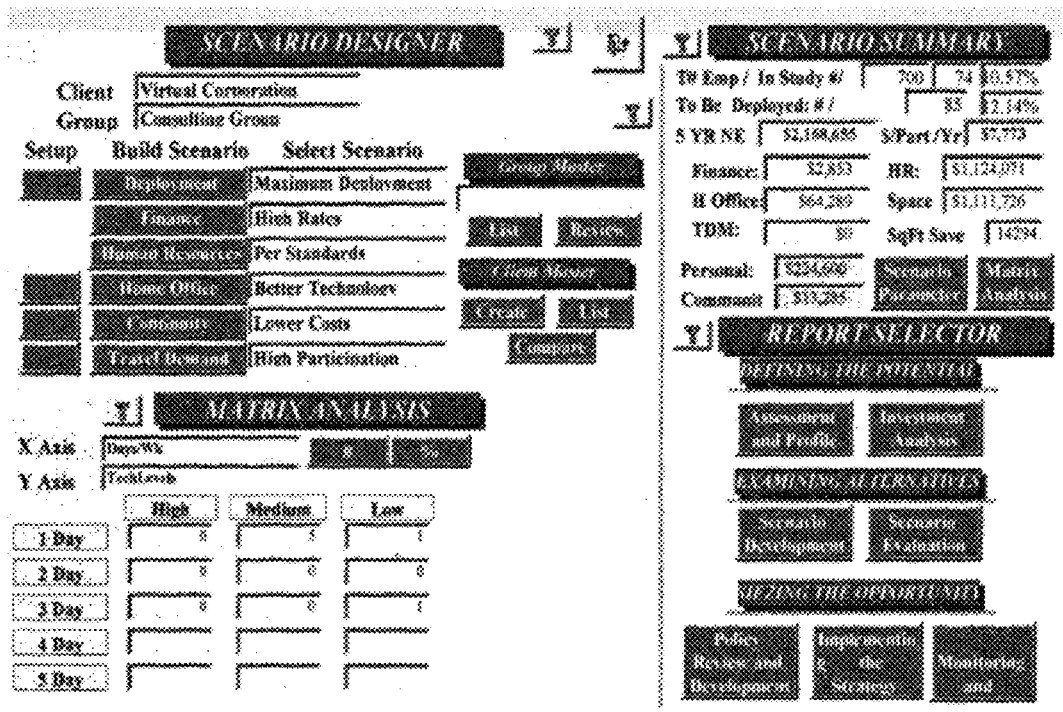
FIG. 12 is a screenshot of a scenario modeling user interface, according to an embodiment.
Figure 13:
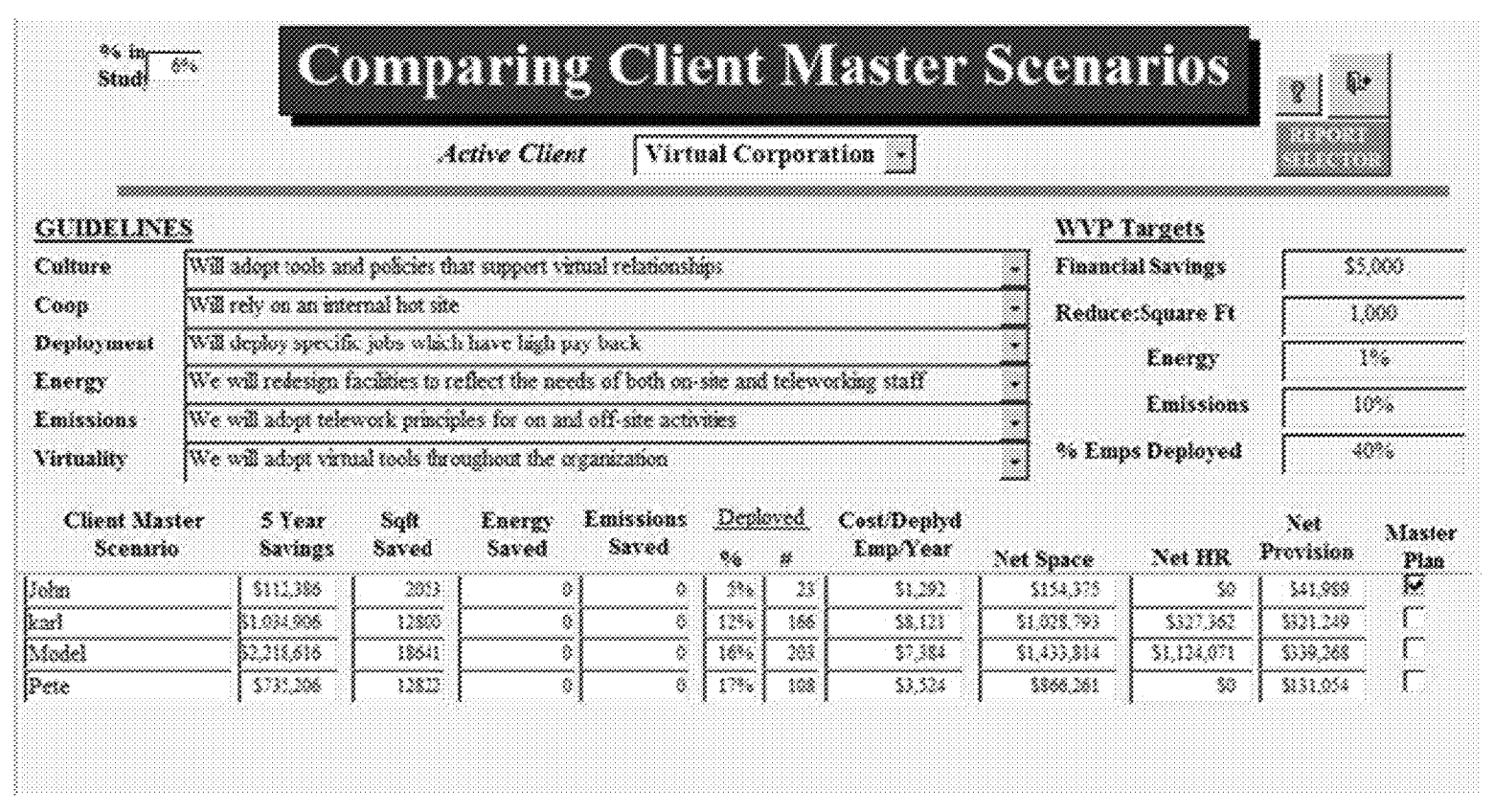

As depicted in FIG. 11, each scenario can comprise one or more component scenarios that can be defined independently. In an embodiment, component scenarios can include job class deployment 64, finance 66, human resources 68, tele-work configuration 70, continuity 254, and travel demand management 72. During scenario definition 402, user interface 202 can present options to the user to modify data items within each component scenario on a modeling screen 62. A modeling screen 62 can be seen in FIG. 12 and FIG. 13. Multiple proposed scenarios can be developed for each component scenario. Data items and proposed scenarios can be stored in modeling module 218. Exemplary component scenarios and associated data items are discussed in more detail in US2003/013559A1 ¶¶57-63 incorporated herein by reference.

Modeling module 218 can calculate deployment targets such as number of workers deployed, facility use reduction, business continuity restoration time, deployment cost, and deployment savings for each possible combination of proposed scenarios for each component scenario. In an embodiment, user interface 202 can display the results of each combination to the user. In embodiments, the user can selected the recommended master scenario 74 based on the combination of component scenarios that best meets the goals of the organization.

In an embodiment, continuity 254 considerations can include geographic information system (GIS) models. For example, the modeling module 218 utilized for a particular region or area can be developed or first analyzed by a GIS model to determine the risks or threats to which the region or area might be vulnerable. In an embodiment, once the particular risks or threats are determined, as well as the regions or areas covered, modeling module 218 can be utilized to expand the recommended master scenario 74 to outside the region or area. As a result, the geographic risks or threats are reduced.

In an embodiment, once modeling module 218 processing has completed, a recommended master scenario 74 is output. In an embodiment, recommended master scenario 74 is input to policy review and development phase 16.

Figure 28:
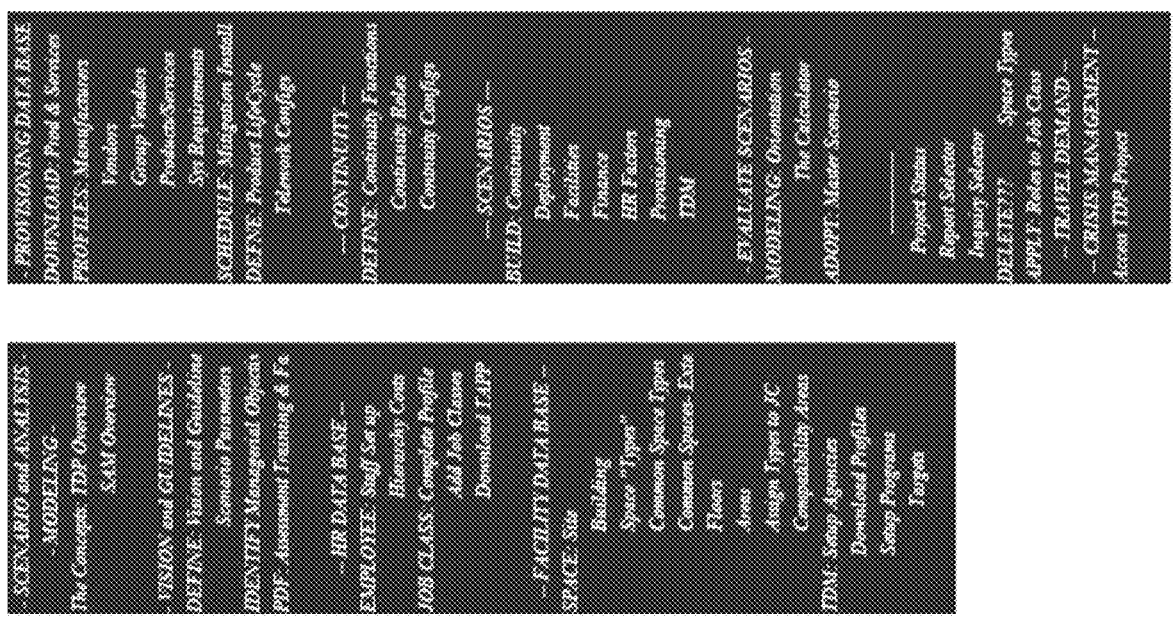
FIG. 28 is a screen shot of a menu in user interface facilitating a scenario assessment and modeling process, according to an embodiment.

FIG. 28 depicts menu options that can be presented by user interface 202 in order to facilitate scenario assessment and modeling phase 14.

Phase 4

Figure 14:
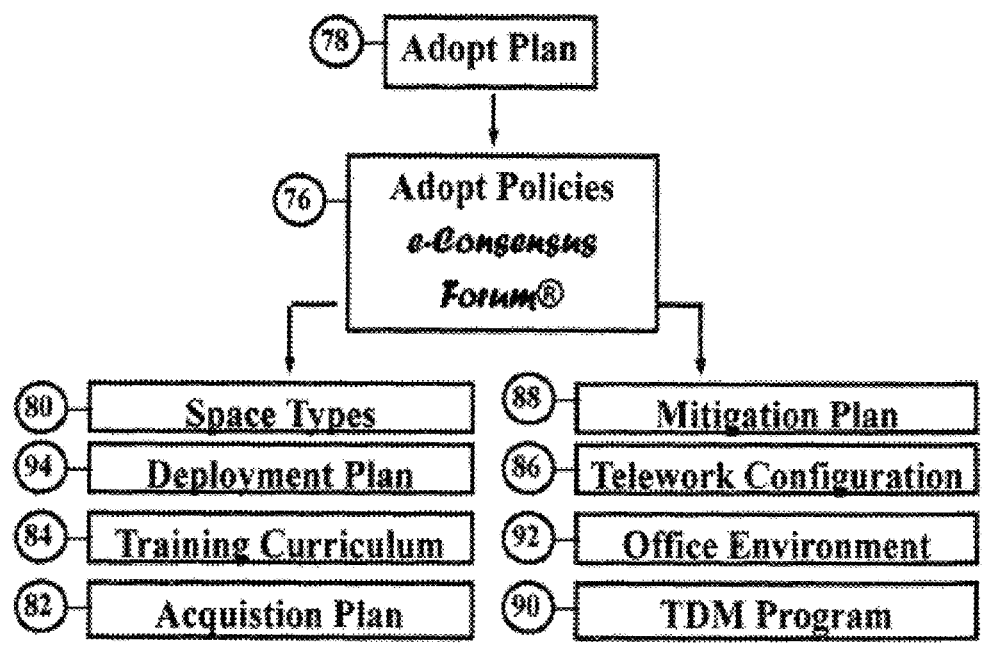
FIG. 14 is a block diagram of a policy review and development phase, according to an embodiment.

Referring to FIG. 14, a policy review and development phase 16 can allow the organization to review their current policies, and modify or draft new policies as needed to implement a plan based on the recommended master scenario 74. In an embodiment, policy review and development phase 16 is substantially similar to policy review and development phase 108 as shown in FIG. 1. Policy review and development phase 16 can comprise tasks such as plan adoption 78 and policy adoption 76.

In an embodiment, planning module 208 can gather data regarding the organization's current policies via ERP interface 206, or from the user directly through user interface 202. Planning module 208 can identify policy areas that do not have policies identified. Planning module 208 can also allow users to review, update, and draft policies. Policies can be stored in database tables, or any document data format, including, but not limited to Microsoft Word documents or Portable Document Format (PDF) documents. Policies can be assigned to job classes, and applied to individual employees at the time of deployment (see Phase 5). As will be described, default job class policies are applied to the individual employee at the time of deployment and edited to personalize the process. Note this is in contrast to traditional policies that are applied universally and are not integrated beyond a single document.

Policies can include Continuity and Risk Exposure and Response Policies, Participation Policies, Communications Policies, Remote Operations Policies, Evaluation Policies, Support Policies, Inspection Policies, Work Schedule Policies, and Technology Policies.

Policies for a worker evaluation process can be developed. The evaluation policies can specify which evaluations will be performed for each worker and on what schedule. The worker evaluations can measure each worker's compatibility with virtualization prior to deployment and/or monitor their experience as a virtual worker post-deployment. In an embodiment, the worker evaluation process can utilize data from the Human Resources data structure.

In an embodiment, an evaluation can include an evaluation code. The evaluation code can be a unique identifier allowing the competitive intelligence system to gather data across responses to each evaluation. An evaluation can include a purpose which indicates why the evaluation is being conducted. An evaluation can include an evaluation type. In embodiments, the evaluation type can be routine, pre-deployment, or thirty days after deployment, for example.

In an embodiment, an evaluation can have a schedule specifying how often the evaluation should be performed. The evaluation schedule can change based on the job class, the maturity of the virtual worker, the type of evaluation and other factors. The workforce virtualization program system can notify administrators or individual employees when evaluations are due.

In an embodiment, an evaluation can include one or more questions. Each question can have a prompt and a response. Responses can be open ended (for example, text fields), or limited (for example, multiple choice questions). Evaluations can be presented to the user via computer-based forms, paper forms, or in oral interviews. Responses can be collected automatically, or manually entered in the workforce virtualization program system.

Figure 15:
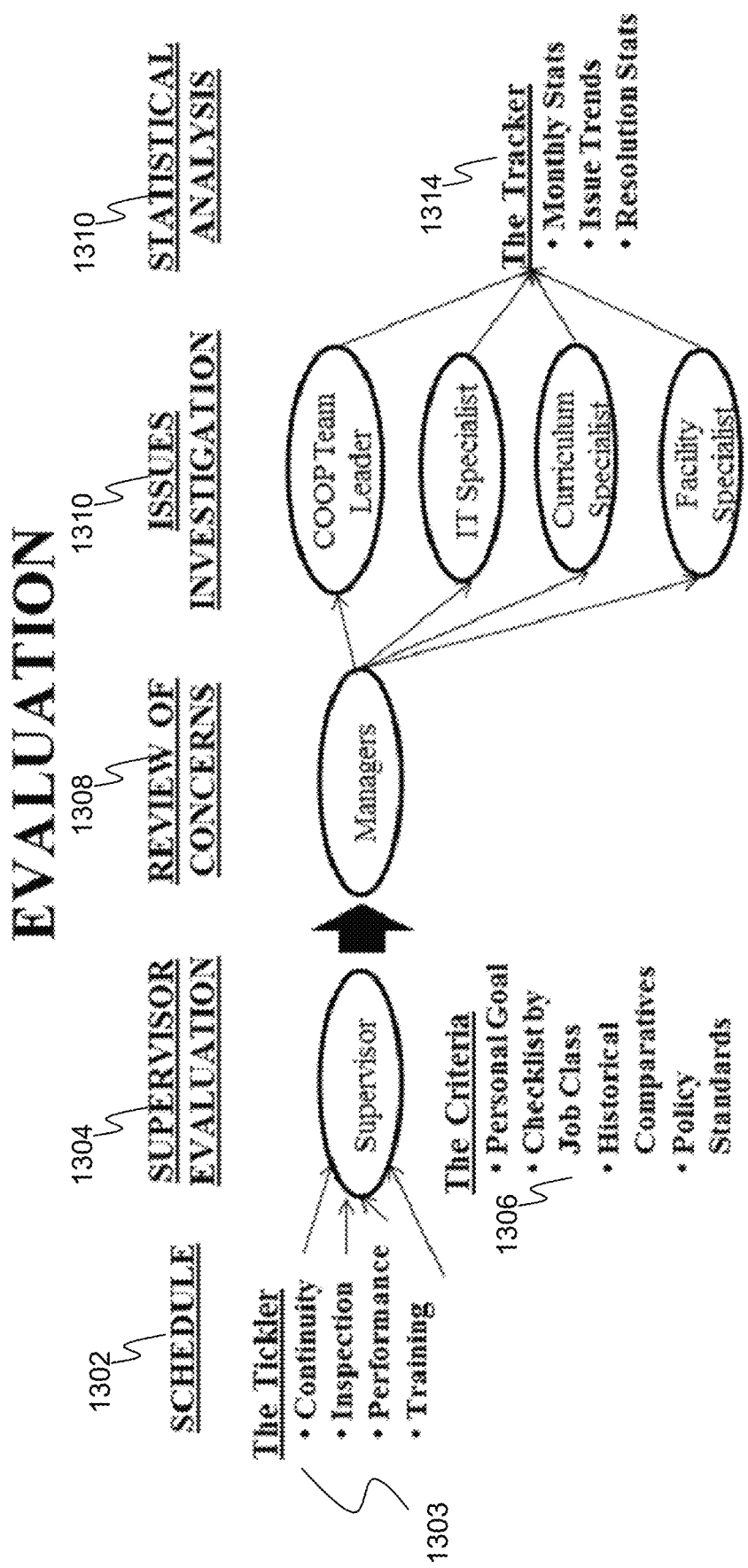
FIG. 15 is a flow diagram of an evaluation process, according to an embodiment.

Referring to FIG. 15, a worker evaluation process according to one embodiment is depicted. Evaluations can be initiated according to a schedule 1302, schedule tracking module 208 can provide notifications when evaluations are due. A supervisor evaluation 1304 can be performed based on various criteria 1306. Criteria 1306 can include personal goals, job class specific checklists, historical comparisons, and policy standards. A tickler 1303 can comprise a single point of contact that notifies evaluators of evaluations that are due in each of the areas. Using a report by exception approach, each issue is evaluated. In an embodiment, an issue list can be common across departments, organizations, or multiple organizations. For those that are in compliance, the issue ends; for those with concerns, the issues move up the line. For example, an issue can be moved up first for follow-up by the evaluator, then by the department, then by the implementation team investigator. Any manager can review concerns 1308 which can prompt more detailed issues investigation 1310. Finally, statistical analysis 1310 can be performed to store evaluation data in tracker 1314. Statistical analysis 1310 can include maintaining statistics to track data items such as which issues reoccur, or identify trends so that the organization can update policies as needed. Evaluations are tracked for trends and patterns across unique logs. In embodiments, management users are therefore able to see what is happening before there is a crisis. Additionally a summary of trends are profiled for each job class and each virtual worker. In an example, FIG. 15 can comprise the evaluation of an employee. Reporting by exception is conducted by listing all activities of the employee. All at-issue activities are selected and the rest are ignored, or assumed to be acceptable. Problems are therefore identified early on, in embodiments. Evaluation can be conducted at any frequency, according to the organization, department, manager, etc. evaluation cycle.

In an embodiment, a support mode evaluation may be provided. Evaluation of support mode allows the organization to monitor how well a team consisting of on-site and virtual workers interacts. The support mode evaluation can include a question pertaining to co-worker reliance in order to measure how much the responder relies on his or her co-workers. The support mode evaluation can also include a question pertaining to co-worker rapport in order to measure how well the responder gets along with his or her co-workers. The support mode evaluation can also include a measure of the responder's perception of the effectiveness of technical support.

Referring to FIG. 16, an example table of evaluation issues, evaluation methods for the evaluation issue, and trends for the evaluation issue are depicted. In embodiments, the trend for a particular evaluation issue can be determined based on an analysis of the particular issue, the data returned, and the method of evaluation. In an embodiment, a System ID controls the entry screen in which the evaluation issue is displayed. In embodiments, the System ID further controls the method used for evaluation. In an embodiment, a second screen is linked and displays the scoring definitions used in the evaluation. In an embodiment, the trend is a statistical link that is used to summarize general trends in performance.

In an embodiment, an inspection evaluation may be provided. Inspections allow an organization to ensure that a virtual worker has an appropriate remote environment to work in. Inspection evaluations can be scheduled to occur at initial deployment and at intervals thereafter. Inspections can occur at various venues, such as on site, or via video.

In an embodiment, the assessment process can remedy HR resource problems. For example, for each job class, a set of criteria can be utilized. In an embodiment, evaluations can be made by exception using a criteria set including an at-issue "problem" for the organization. For example, for a particular problem, a high-level group manager can first be tasked with evaluating or resolving the problem. The group manager can pass that problem to an IT manager, whom he believes should be responsible for evaluating or resolving the problem. The problem is then tasked to the IT manager. Likewise, if the IT manager believes the problem is outside of the scope of his duty, he can pass that problem to a lower-level IT associate. At that point, the problem is then tasked to the lower-level IT associate, who can pass it further, and so on. Statistical analyses can then be conducted on key problems (for example, those issues identified by the evaluators of multiple job classes or individuals).

Figure 17:
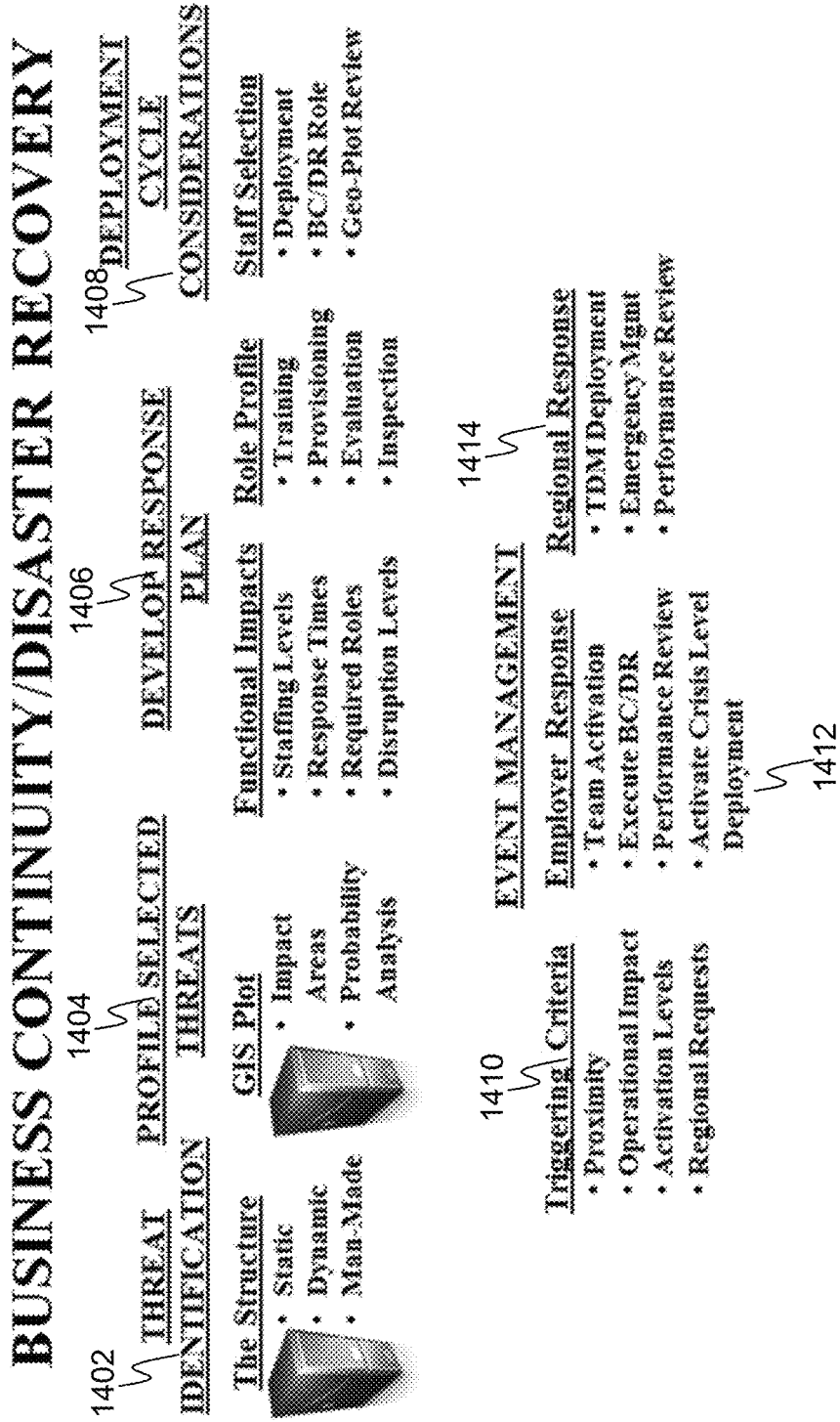
FIG. 17 is a listing of steps in a business continuity policy, according to an embodiment.

Referring to FIG. 17, policies related to business continuity can be developed. An exemplary business continuity policy can comprise a disaster response plan. Tasks required to develop a disaster response plan can comprise identifying 1402 and profiling threats 1404, developing a response plan 1406 for high risk threats, and provisioning equipment and deploying employees 1408 to support the response plan. In an embodiment, threat management can be further defined by triggering criteria 1410, employer response 1412, and regional response 1414. A threat can be triggered according to triggering criteria 1410. Once triggered, responses to the threat can be evaluated against employer response 1412 and regional response 1414 such that the response plan can be updated. For example, if regional response 1414 is sufficient to reduce the impact area, a corresponding reduction in resources needed in that impact area can be promulgated in the response plan.

Threats can be identified based on data from location module 214, competitive intelligence module 210, or directly from the user via user interface 202. In embodiments, threats can be profiled to determine which threats pose the highest risk to the organization. Factors used to determine threat risk can include the number of organization facilities and workers potentially impacted by a single threat, the cost of potential impacts of a single threat, and the probability of the threat occurring. Each threat can be assigned an impact area, based on the threat type. For example, hurricanes can have very large impact areas, whereas tornadoes are generally more localized. Data from location module 214 and planning module 206 can allow the user to determine which facilities and workers might exist within an impact area for a given threat. The user can indicate which threats are considered high risk and should be planned for. The high risk threats can be stored in the planning module in an embodiment.

Figure 18:
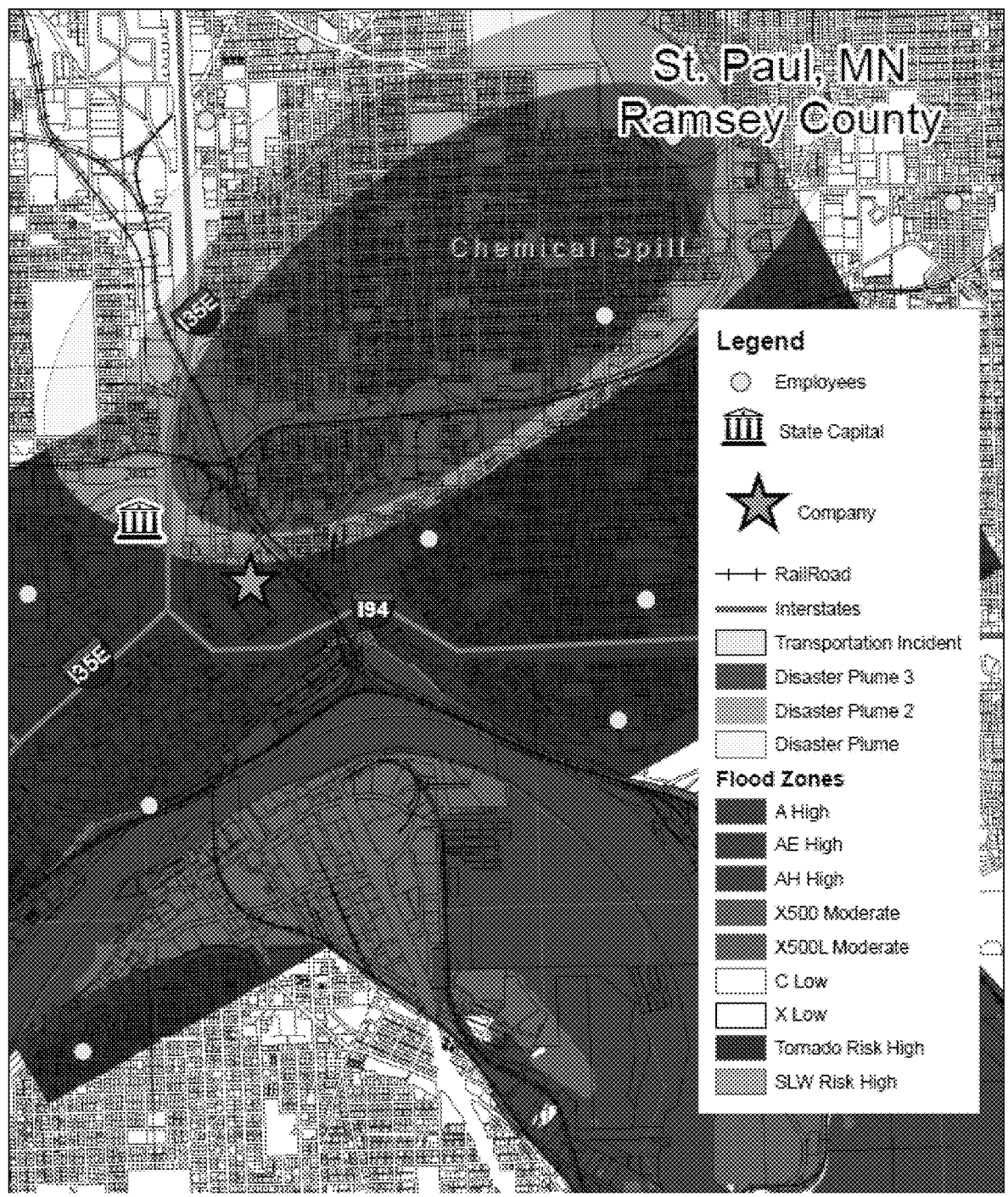
FIGS. 18-19 are maps of disaster threats and impact areas, according to embodiments.
Figure 19:
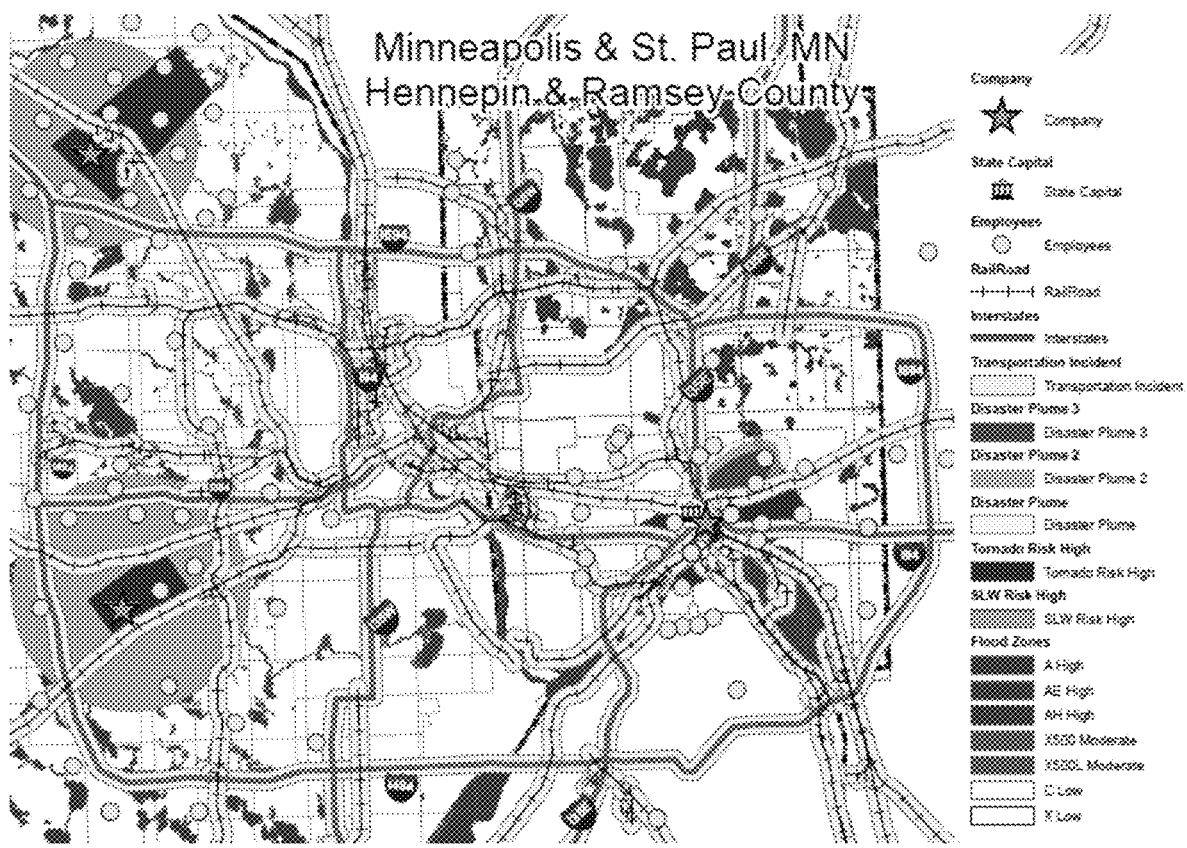

For example, referring to FIGS. 18 and 19, maps of disaster threats and impact areas are shown. Chemical spill and related disaster plume impact areas are depicted as areas covering portions of the maps. Likewise, tornado risk and wind risk impact areas are shown. Further, flood risk impact areas are also shown. Overlaid on the maps and impact areas in particular, are employees' respective locations and the company headquarters.

The response plan for a given threat can comprise identifying the job classes required to respond to the threat, training workers within each job class, provisioning equipment for workers, and evaluation and inspection of worker readiness. The response plan can ensure that deployed workers are located sufficiently far away from facilities to ensure that workers will not be affected by a threat that affects a facility. Once deployed, workers can be ready to respond to a disaster event and restore business functions according to the response plan. Worker responses can include connecting to alternative servers, or changing work priorities based upon the response plan. Geolocating deployed workers and/or hardware used by the deployed workers can further be utilized to develop the response plan. In other embodiments, geolocating deployed workers and/or hardware used by the deployed workers confirm compliance with the response plan.

The response plan can comprise responses for one or more crisis levels. Crisis levels can be specified by the organization, or can be provided by external organizations such as a regional government. In an exemplary embodiment, a crisis level could require minimizing traffic on major roads. In this example, a response plan could include instructing workers who have the ability to work remotely to avoid travelling to the organization's facilities. In another embodiment, a crisis level could require minimizing network bandwidth used in the region. In this example, a response plan could include instructing remote workers to travel in to the organization's facilities in order to work. In yet another embodiment, the system can alert workers to an event and each would follow response plan guidelines to maintain applications. If the main server is knocked out, the workers could switch to the pre-determined alternative. Non-deployed workers could respond in accordance with the response plan with additional workers being deployed as scheduled based upon the profile of the threat.

In an embodiment, policy review and development phase 16 can further comprise a pilot implementation. A pilot implementation allows the organization to test the deployment plan on a small subset of workers. The pilot implementation can comprise tasks such as defining the scope, including the number of employees of each job class to be deployed, identifying candidate workers, identifying the frequency of deployment of candidate workers, deploying candidate workers, and testing to ensure that worker technology works as expected. In an embodiment, a pilot implementation can effectively initiate deployment of the larger deployment plan by opening up space in the pilot implementation facility upon pilot deployment. In an embodiment, a pilot implementation can begin with the highest deployment levels, then proceed with the lower levels as needed. In an embodiment, a second phase of a pilot implementation can provide on-site workstations to add flexibility as on-site workers can be deployed to these on-site workstations.

Figure 29:
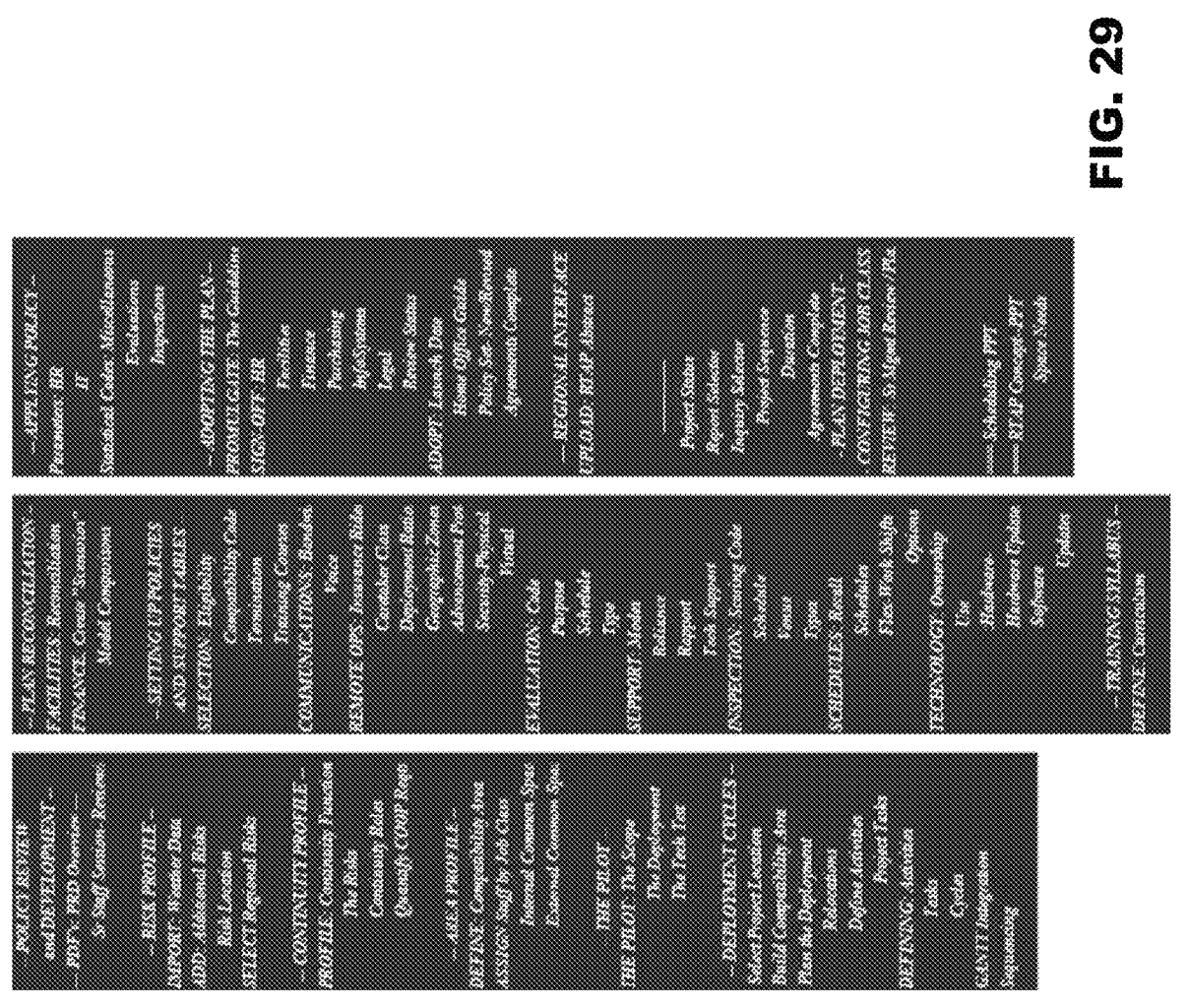

FIG. 29 depicts menu options that can be presented by user interface 202 in order to facilitate policy review and development phase 16.

Phase 5

Figure 20:
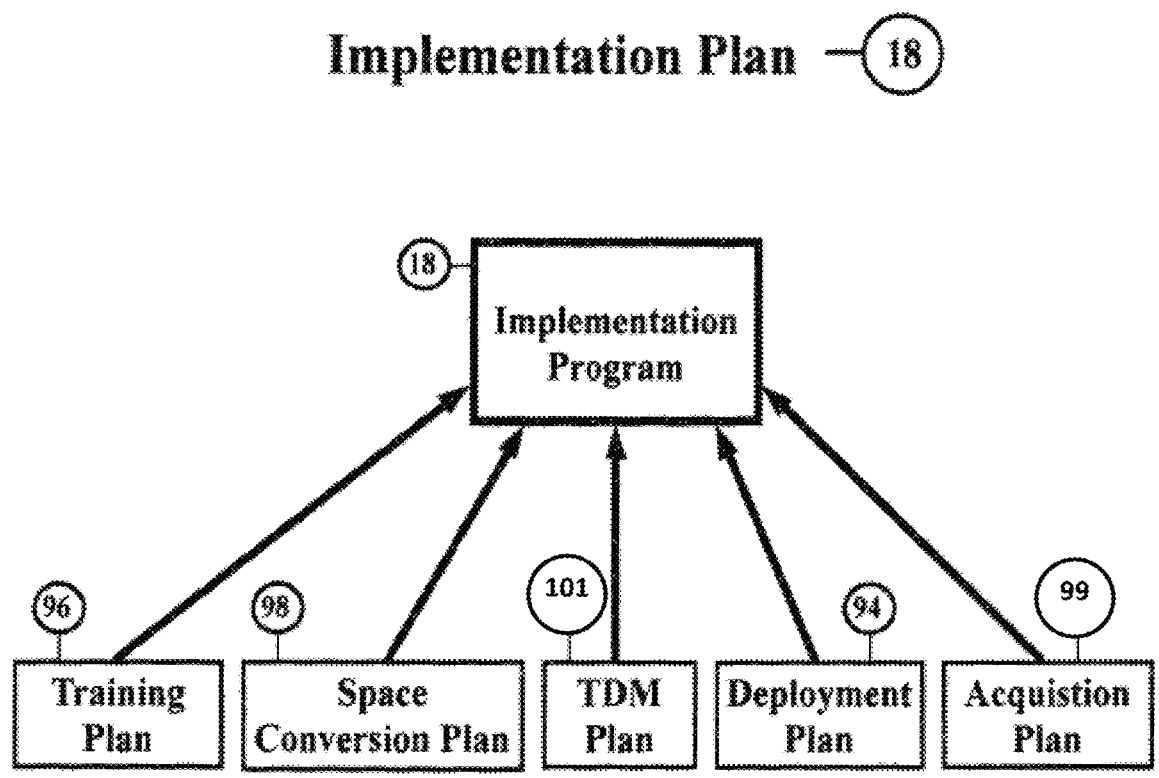
FIG. 20 is a block diagram of an implementation plan phase, according to an embodiment.

Referring to FIG. 20, virtualization implementation process 18 can implement the adopted plan and policies. In an embodiment, virtualization implementation process 18 is substantially similar to virtualization implementation phase 110 as shown in FIG. 1. According to an embodiment, virtualization implementation process 18 comprises developing coordinated plans for deployment 94, training 96, space conversion 98, acquisition 99, and travel demand management (TDM) 101 in order to actually implement the adopted plan and policies.

In an embodiment, planning module 204 can allow the user to define a schedule for deployment which can be stored in schedule tracking module 208. The schedule can comprise multiple cycles in order to facilitate phased roll-out of the deployment plan. In embodiments, the schedule can further comprise checklists for each functional area, such as facilities, finance, human resources, information systems, and purchasing. In embodiments, other, additional, or fewer functional area checklists can be provided.

In an embodiment, deployment plan 94 can define the schedule for the deployment of each job class, including the selection of individuals to be deployed. In other embodiments, deployment plan 94 can define the overall plan, or portions or segments thereof.

In an embodiment, training plan 96 can define a profile of courses to be taken by workers who will be deployed. In embodiments, training plan 96 comprises a schedule of courses. In embodiments, training plan 96 further comprises a checklist or database of courses and the workers taking or scheduled to take those courses. In other embodiments, a profile of courses of training plan 96 can be utilized with separate tracking databases to determine which workers have taken which courses.

Figure 21:
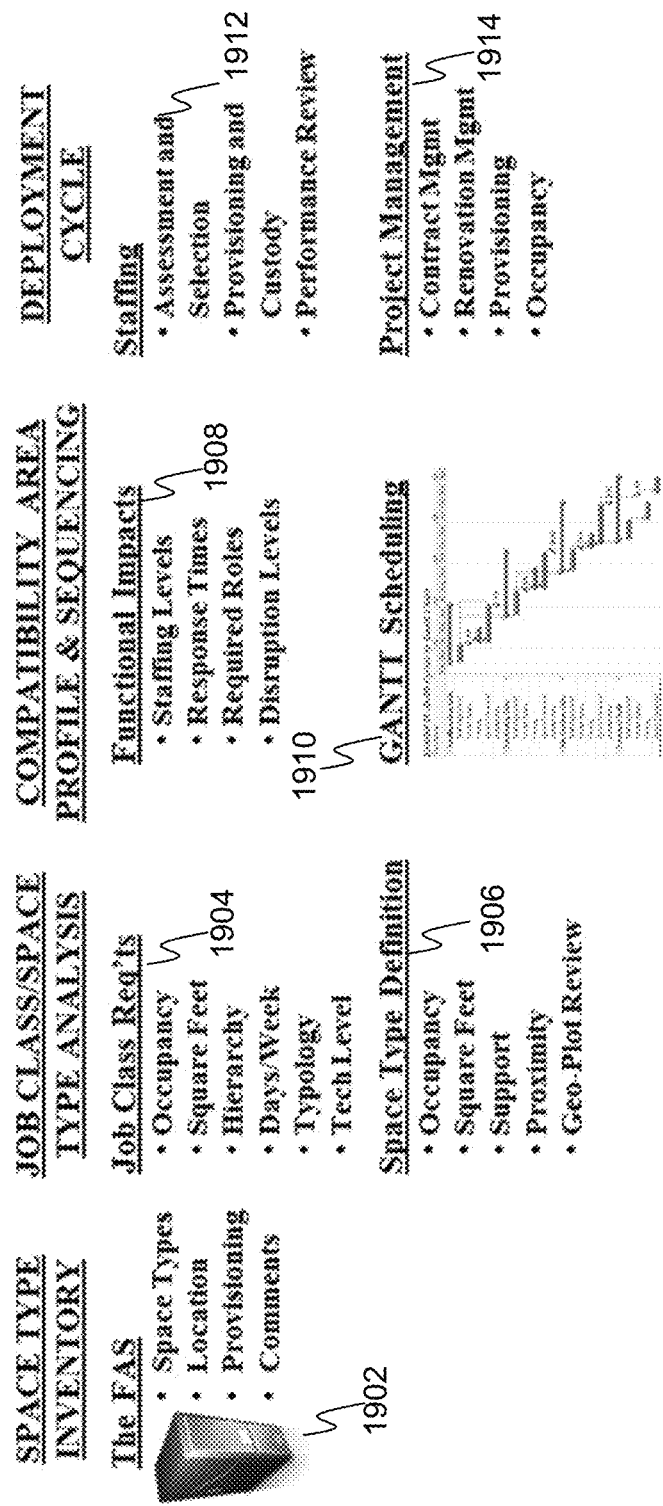
FIG. 21 is a listing of the steps of a space conversion plan, according to an embodiment.

In an embodiment, space conversion plan 98 can determine, based on the deployment plan, facility space that can be repurposed, or is no longer needed. In embodiments, space conversion plan 98 comprises timing, scheduling, space identification, and other factors utilized to convert workspaces. In embodiments, space conversion plan 98 further identifies workers or employees for relocation as space is converted and deployment builds. FIG. 21 depicts a more detailed view of space conversion plan 98 according to an embodiment. A facility audit survey can provide a space type inventory 1902, identifying the space that is currently available. Job class requirements 1904 can be used to complete a space type definition 1906. Functional impacts by compatibility areas 1908 can be considered and schedule tracking module 1910 can store and produce a schedule, including GANTT charts. During deployment, individual staff can be deployed 1912, and necessary projects such as renovation, provisioning, contracts, and occupancy can be managed 1914.

In an embodiment, space conversion plan 98 can facilitate the creation of compatibility areas. Compatibility areas are specialized on-site work areas intended to provide generally temporary spaces for remote or partially remote workers when working on-site. Because compatibility areas are intended to allow workers to perform functions that they cannot do remotely, compatibility areas may not require traditional workstations, according to an organization's needs. For example, an organization may have 100 workers, of which 75 can work remotely four days per week, 15 one day per week, and 10 may be on-site. In order to support the 75 deployed workers, a compatibility area can be constructed that contains 15 temporary (hotelling) workstations and 8 meeting rooms.

Compatibility areas can be established at any time after initial workers have been deployed. For example, after the pilot implementation discussed above, empty workstations may exist which can allow the organization to temporarily assign on-site workers from their normal workspaces to the empty workstations, allowing large contiguous areas to be vacated and converted. On-site workers can then be re-assigned to the converted compatibility areas. This space conversion can happen in multiple cycles beginning with the pilot implementation. Planning module 204 can generate space conversion plan 98 based on an organization's deployment goals.

In an embodiment, acquisition plan 99 can define the schedule for procuring equipment required in order to deploy properly equipped workers. In embodiments, acquisition plan 99 comprises the equipment needs list. In embodiments, acquisition plan 99 further comprises equipment needs list broken down by employee, spatial area, functional area, or at department-level or company-level. In embodiments, virtualization system 200 can also assign equipment to workers and generate one or more custody reports.

Travel Demand Management Plan 101 can define the regional agencies that the organization intends to report deployment information. For example, TDM 101, via the appropriate interfacing module, can alert, notify, or otherwise work with local, regional, or national agencies to report progress of deployment. In an embodiment, TDM 101 can be guided by local, regional, or national agencies, for example, by number of employees deployed at certain times (peak travel times or timeframes).

Schedule tracking module 208 can be updated with the status of each of the plans as they are implemented in order to provide an overview of the status of the deployment process. In embodiments, schedule tracking module 208.

In embodiments, the physical layout of a facility or facilities can be determined based on the facility right-sizing procedures described herein. Moreover, facility right-sizing can provide a comprehensive analysis of all buildings and sites for an organization, as well as for all buildings and sites of multiple organizations. In this way, space can be optimized for an organization such that extra space can be sold or subleased, and space can be optimized for multiple organizations to decrease traffic and increase the efficiency of an area, such as a city center.

Figure 22:
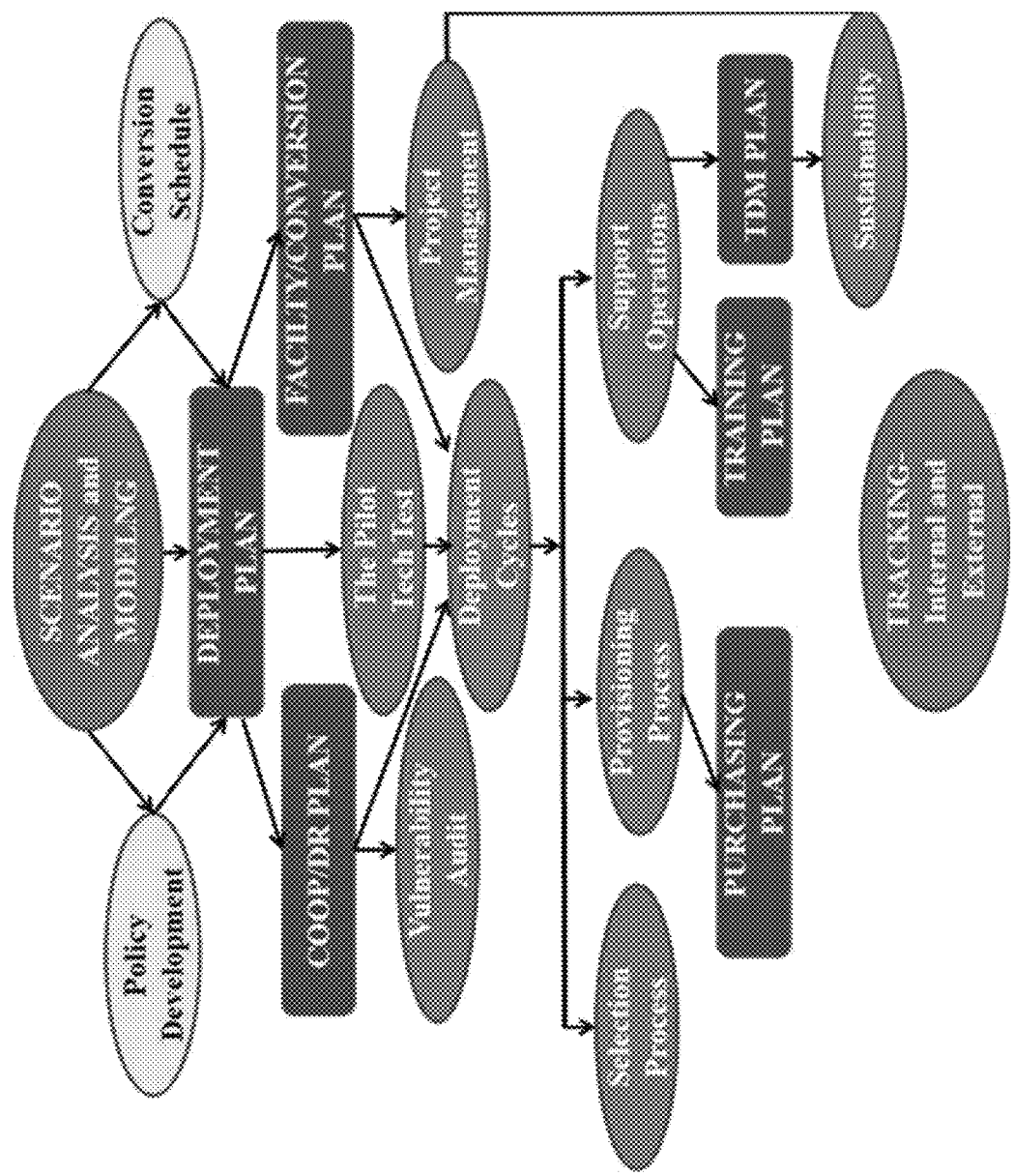
FIG. 22 is a block diagram of an alternate implementation plan phase, according to an embodiment.
Figure 30:
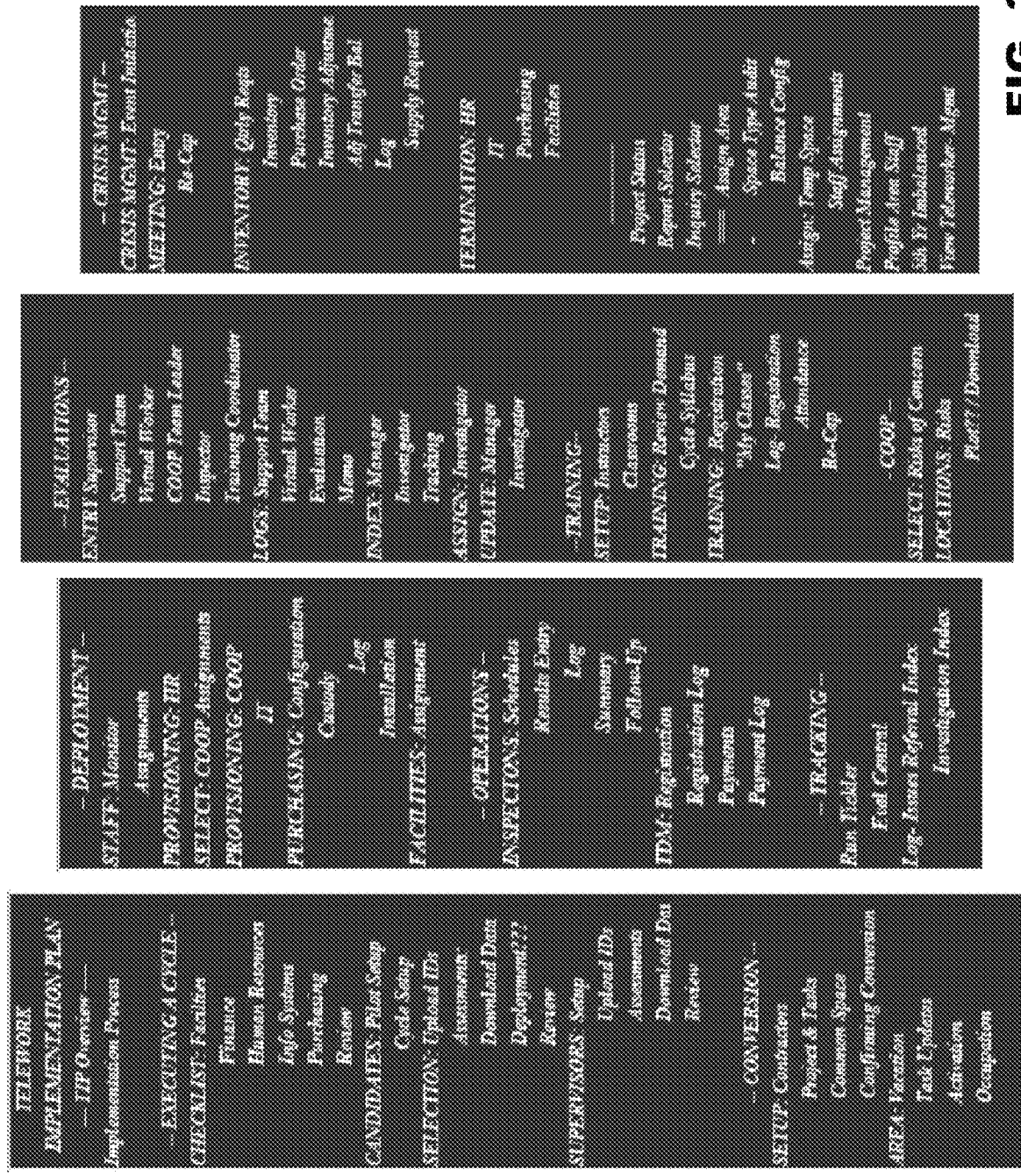
FIG. 30 is a screen shot of a menu in user interface facilitating an implementation plan phase, according to an embodiment.

FIG. 22 depicts an alternative flow for virtualization implementation process 18, according to an embodiment. FIG. 30 depicts menu options that can be presented by user interface 202 in order to facilitate virtualization implementation process 18.

Phase 6

Figure 23:
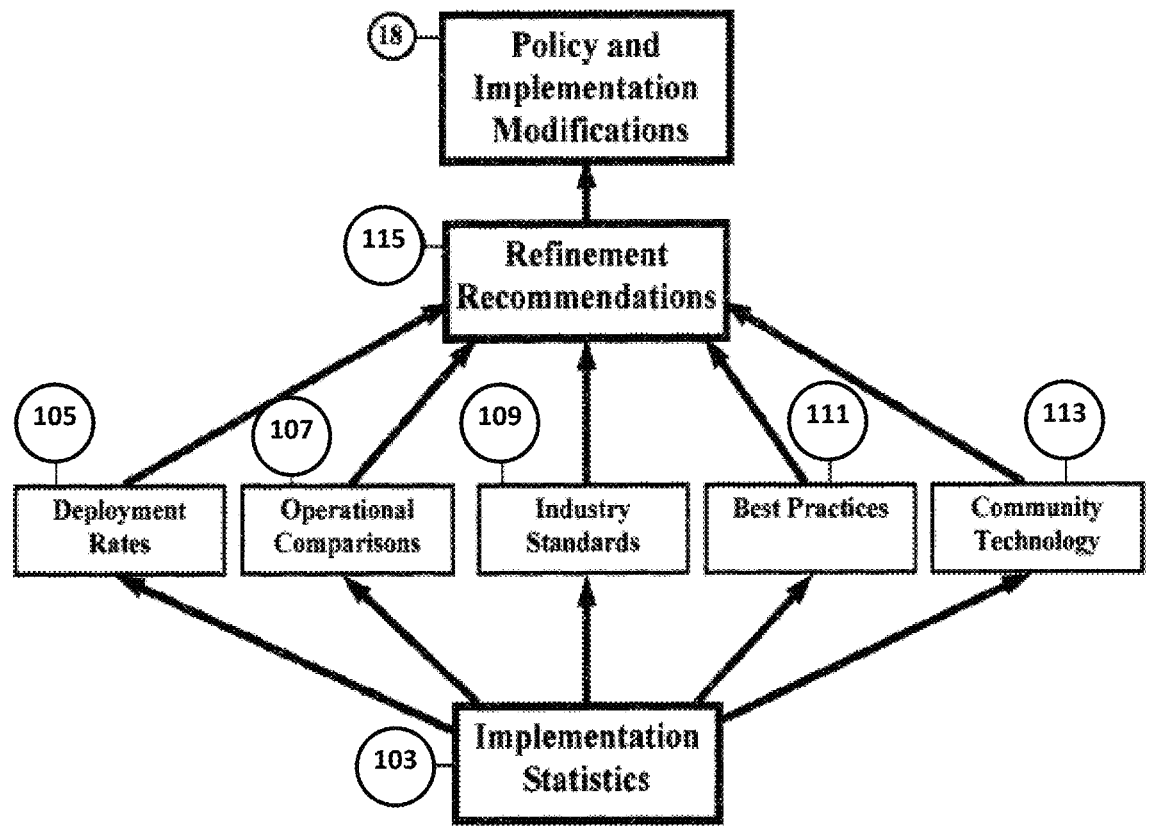
FIG. 23 is a block diagram of a monitoring and refinement process phase, according to an embodiment.
Figure 24:
FIG. 24 is a listing of monitoring and refinement process criteria or evaluation factors, according to an embodiment.

Referring to FIG. 23, monitoring and refinement process 20 can allow an organization to track implementation and compliance with the deployment plan. In an embodiment, implementation statistics 103 can be analyzed in light of deployment rates 105, operational comparisons 107, industry standards 109, best practices 111, and community technology 113 to provide a set of refinement recommendations 115. In other embodiments, refinement recommendations 115 are further defined by other, fewer, or additional parameters or data sets. In embodiments, refinement recommendations 115 are analyzed or otherwise synthesized to generate a set of policy and implementation modifications 18. Referring to FIG. 24, a set of competitive intelligence data or monitoring and refinement process criteria or evaluation factors by which monitoring and refinement process 20 can be evaluated is depicted. For example, in the category configurations, criteria such as component costs and configuration classification can be utilized. In an embodiment, a deployment category can be utilized. In an embodiment, in the category employer, criteria such as occupations, goals, operations scale, overview, and policy classes can be utilized. In an embodiment, in the category facilities, criteria such as buildings, spaces, and square footage can be utilized. In an embodiment, in the category scenarios, criteria such as human resource factors and financial factors can be utilized. In an embodiment, a modes category having criteria such as techniques can be utilized. In an embodiment, in the category training, criteria such as audience by class, audience miscellaneous, courses, and deployment can be utilized. In an embodiment, in the category operations, criteria such as evaluation, inspection, and work balance can be utilized.

In other embodiments, monitoring and refinement process 20 can track implementation and compliance with the deployment plan by geolocating equipment utilized used in the deployment plan. For example, a computer equipped with geolocating hardware can be tracked over the aforementioned networks to determine proper deployment and usage by a particular employee, such as at the employee's house or within the area(s) specified by the plan. GIS server 506, for example, can be configured to ping a deployed piece of hardware and receive a location indication.

Figure 25:
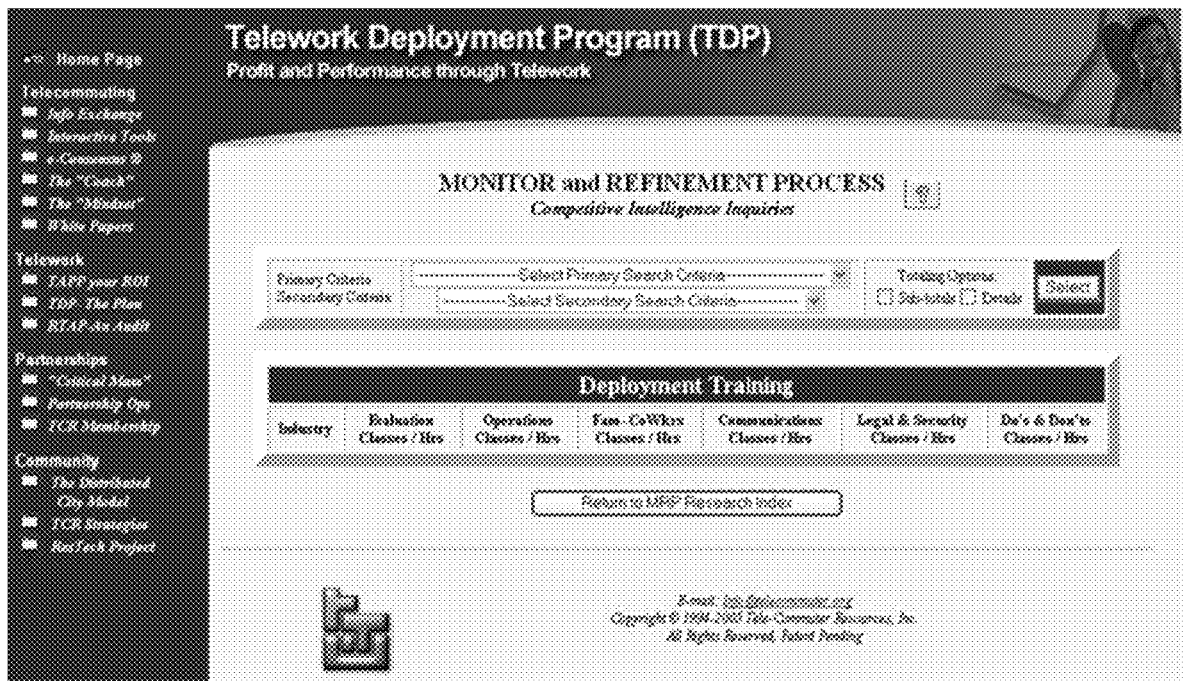
FIG. 25 is a screenshot of a selection of monitoring and refinement process criteria or evaluation factors and deployment training results, according to an embodiment.
Figure 26:
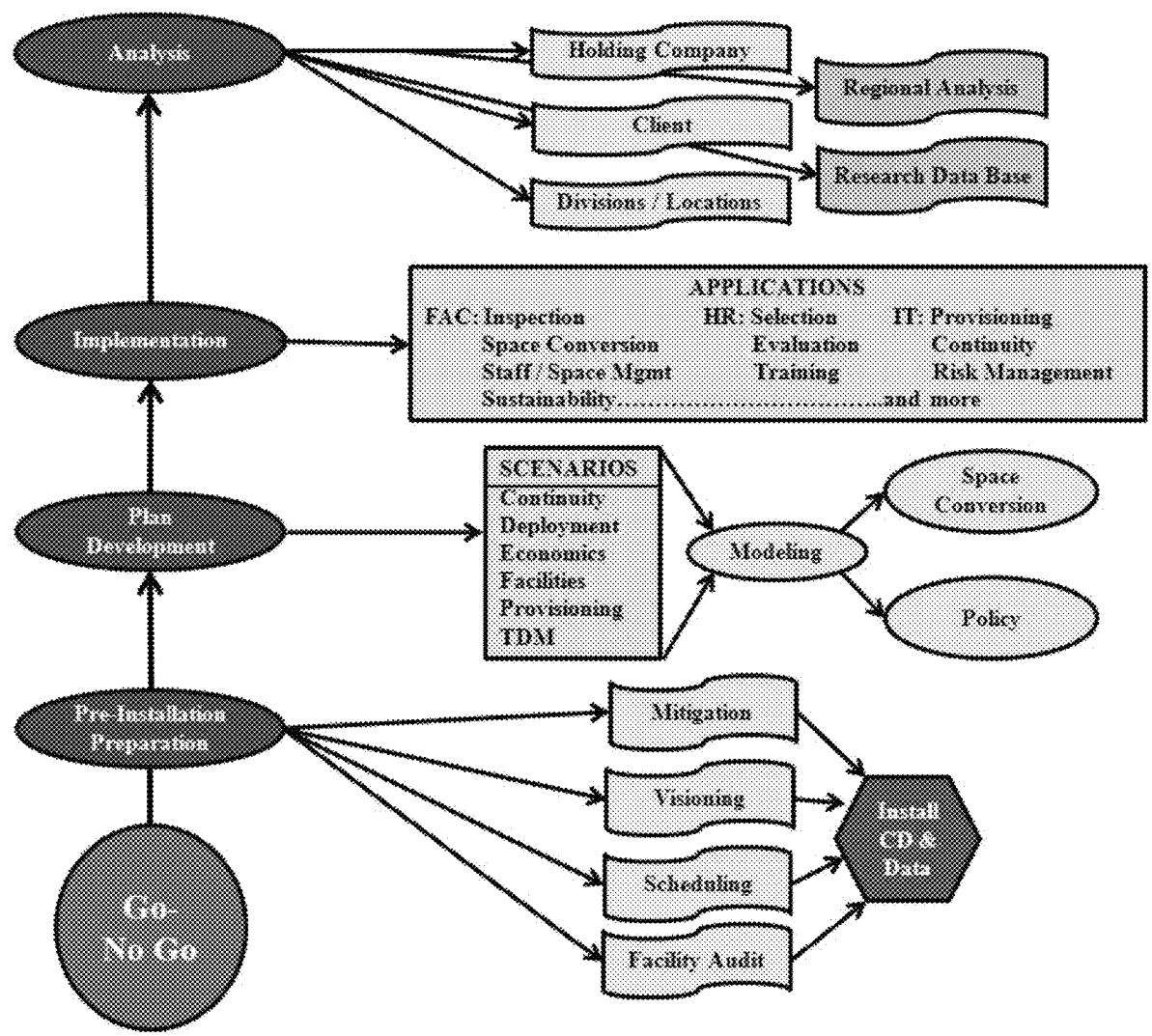
FIG. 26 is a flow diagram depicting some phases of a workforce visualization program, according to an embodiment.

The aforementioned systems can provide tools and interfaces for deployment training, and particularly, monitoring and refinement of the deployment process. Referring to FIG. 25, a screenshot of a selection of monitoring and refinement process criteria or evaluation factors and deployment training results is depicted, according to an embodiment. A primary search criteria can be provided by, for example, a drop-down menu selection. In an embodiment, a secondary search criteria can be provided by, for example, a drop-down menu selection. In other embodiments, search criteria can be provided or input by a user using a free-form text box, radio button, or other input form or mechanism. Once criteria are selected, a search is conducted to populate a deployment training results screen, based on the criteria. In embodiments, results can be provided according to industry, evaluation classes or hours, operations classes or hours, family or co-workers classes or hours, communications classes or hours, legal and security classes or hours, and/or do's and don'ts classes or hours. In embodiments, the search can include data from competitive intelligence module 210 regarding other organization's deployment plans. In other embodiments, other result fields can be provided.

At regular intervals, planning module 204 and schedule tracking module 208 can allow users to enter data items regarding the status of each element of the deployment plan. This status can be stored by competitive intelligence module 210 in a deployment plan profile, which can be forwarded to one or more research servers 508 after local review. Organizations can compare the status of their deployment plan to other external organizations in order to support best practice and effectiveness and modify as necessary.

Schedule tracking module 208 can track completion an identify tasks on the critical path so that the organization can ensure that the deployment plan is on track and take steps (such as decreasing scope, or adding staff) in order to get the plan back on track.

Figure 31:
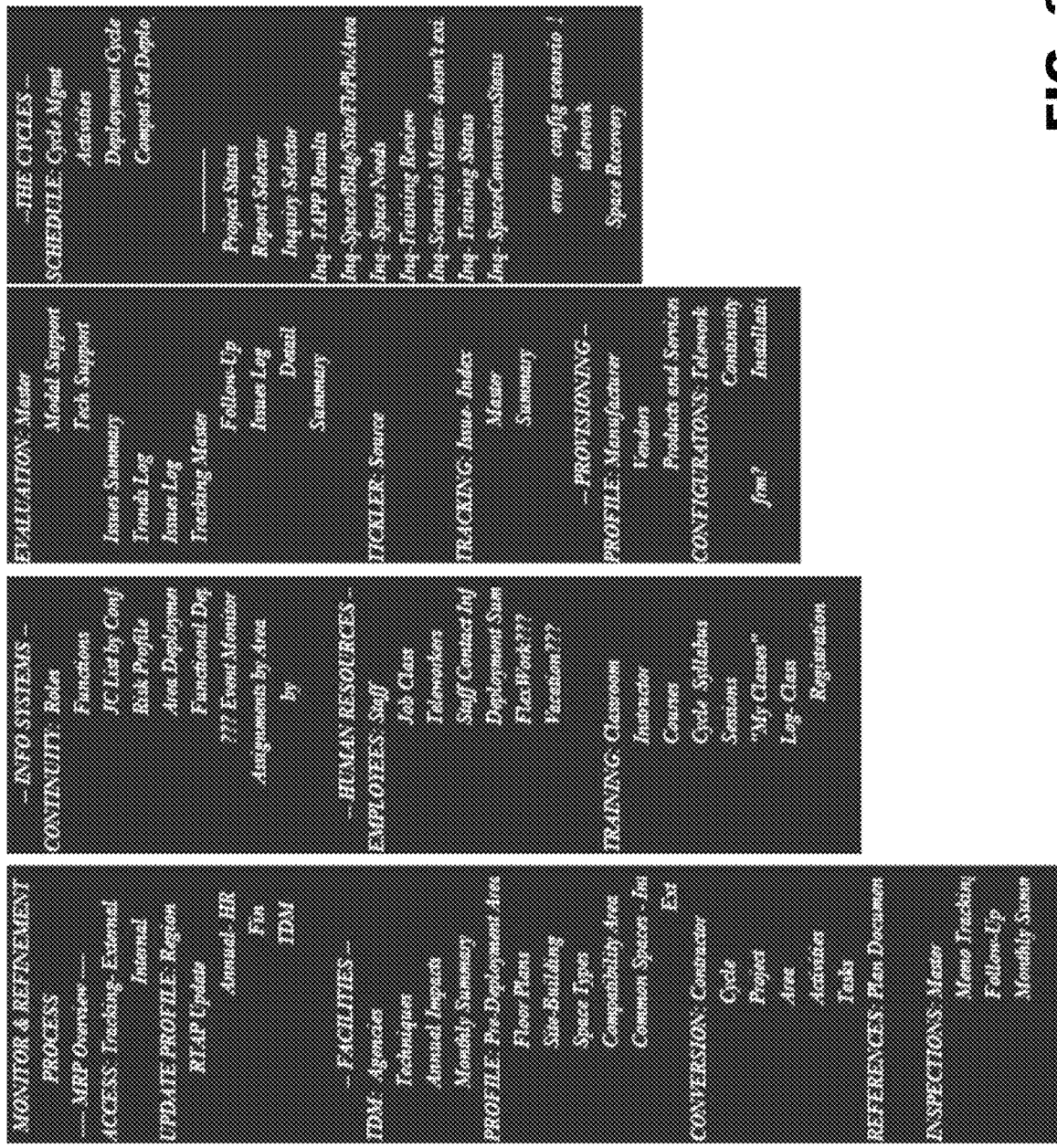
FIG. 31 is a screen shot of a menu in user interface facilitating a monitoring and refinement process, according to an embodiment.

FIG. 31 depicts menu options that can be presented by user interface 202 in order to facilitate monitoring and refinement process 20.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A system for workforce virtualization planning for an organization, the system comprising:
   a computing platform including computing hardware of at least one processor, data storage, an operating system implemented on the computing hardware, a display interface, and input/output facilities;

instructions that, when executed on the computing platform, cause the computing platform to implement:

a user interface configured to present workforce virtualization planning data to a user via the display interface of the computing hardware, a schedule tracking module configured to monitor completeness of a workforce virtualization plan, a planning module configured to present, using the user interface, a plurality of phases of the workforce virtualization plan as monitored by the schedule tracking module, an enterprise resource planning (ERP) interface configured to interface to a traditional ERP system maintained by the organization, the traditional ERP system including organizational data, a location module configured to provide geographic information system (GIS) data from a GIS server, a job information module configured to provide job class data and job hierarchy data, a modeling module configured to model a master scenario according to an iterative analysis, first, on a proposed scenario comparison defining a set of proposed scenarios and, second, on a component scenario comparison selecting a subset of the proposed scenarios, wherein the component scenario comparison is iterated until a master scenario is selected, wherein a first iteration of the component scenario comparison uses a first set of proposed scenarios and a second iteration of the component scenario comparison uses a second set of proposed scenarios including at least one of the proposed scenarios defined in the first set, and a competitive intelligence module configured to:

aggregate and process the organizational data, the GIS data, the job class data, the job hierarchy data, and the modeled master scenario generated by the modeling module, to generate the workforce virtualization plan, wherein after implementation of the workforce virtualization plan, the competitive intelligence module is further configured to:

evaluate worker integration to determine at least one general trend in performance based on the job class data and the job hierarchy data, generate a measure of worker compatibility with the workforce virtualization plan based on the at least one general trend in performance, receive and evaluate a plurality of inputs to the input/output facilities related to the workforce virtualization plan, anonymize data from a plurality of comparable organizations, generate a plurality of process benchmarks from the anonymized data, compare the implemented workforce virtualization plan to the plurality of process benchmarks, and update the implemented workforce virtualization plan.

2. The system for workforce virtualization planning of claim 1, further comprising evaluating the workforce virtualization plan with the computing platform according to a plurality of issues, the plurality of issues being common across the organization.

3. The system for workforce virtualization planning of claim 2, further comprising evaluating the plurality of issues by exception by presenting all issues raising a particular exception to a supervisor user, wherein a selected issue that exemplifies the exception is presented to a second supervisor user for review to be accepted or denied and all non-selected issues are accepted.

4. The system for workforce virtualization planning of claim 1, further comprising a report generation module configured to generate a statistical report based on the data aggregated and processed by the competitive intelligence module.

5. The system for workforce virtualization planning of claim 1, wherein the competitive intelligence module is further configured to anonymize the organizational data, the GIS data, the job class data, the job hierarchy data, and the modeled master scenario data.

6. The system for workforce virtualization planning of claim 1, wherein the location module is further configured to geolocate a hardware device deployed as part of the workforce virtualization plan, and the competitive intelligence module is further configured to determine whether the hardware device is properly located.

7. A method for workforce virtualization planning for an organization using a computing platform including computing hardware of at least one processor, data storage, an operating system implemented on the computing hardware, a display interface, and input/output facilities, the method comprising:

presenting workforce virtualization planning data to a user via the display interface of the computing hardware;

monitoring completeness of a workforce virtualization plan;

presenting a plurality of phases of the workforce virtualization plan as monitored; presenting an enterprise resource planning (ERP) interface configured to interface to a traditional ERP system maintained by the organization, the traditional ERP system including organizational data;

providing geographic information system (GIS) data from a GIS server; providing job class data and job hierarchy data;

modeling a master scenario according to an iterative analysis based, first, on a proposed scenario comparison defining a set of proposed scenarios and, second, on a component scenario comparison selecting a subset of the subset of the proposed scenarios, wherein the component scenario comparison is iterated until a master scenario is selected, wherein a first iteration of the component scenario comparison uses a first set of proposed scenarios and a second iteration of the component scenario comparison uses a second set of proposed scenarios including at least one of the proposed scenarios defined in the first set; and aggregating and processing the organizational data, the GIS data, the job class data, the job hierarchy data, and the modeled master scenario to generate a workforce virtualization plan, wherein after implementation of the workforce virtualization plan, evaluating worker integration to determine at least one general trend in performance based on the job class data and the job hierarchy data, generating a measure of worker compatibility with the workforce virtualization plan based on the at least one general trend in performance, receiving and evaluating a plurality of inputs to the input/output facilities related to the workforce virtualization plan and anonymizing data from a plurality of comparable organizations and generate a plurality of process benchmarks from the anonymized data, comparing the implemented workforce virtualization plan to the plurality of process benchmarks, and updating the implemented workforce virtualization plan.

8. The method of claim 7, further comprising evaluating the workforce virtualization plan with the computing platform according to a plurality of issues, the plurality of issues being common across the organization.

9. The method of claim 8, further comprising evaluating the plurality of issues by exception by presenting all issues raising a particular exception to a supervisor user, wherein a selected issue that exemplifies the exception is presented to a second supervisor user for review to be accepted or denied and all non-selected issues are accepted.

10. The method of claim 7, further comprising generating a statistical report based on the data aggregated.

11. The method of claim 7, further comprising anonymizing the organizational data, the GIS data, the job class data, the job hierarchy data, and the modeled master scenario data.

12. The method of claim 7, further comprising:
geolocating a hardware device deployed as part of the workforce virtualization plan; and
determining whether the hardware device is properly located.

13. The system for workforce virtualization planning of claim 1, wherein the planning module is further configured to identify at least one barrier-limiting additional deployment.

14. The system for workforce virtualization planning of claim 13, wherein the at least one barrier limiting additional deployment is at least one of a policy barrier, a cultural barrier, or a technological barrier.

15. The system for workforce virtualization planning of claim 13, wherein the component scenario comparison selecting a subset of the proposed scenarios within the modeling module is based at least in part on deployment targets affected by the at least one barrier identified.

16. The system of claim 1, wherein the competitive intelligence module is further configured to: aggregate a regional response plan based on disaster-related data from at least two organizations, wherein the disaster-related data includes a lowest level of working environment to support restoration of each job class, a period of time beyond which an organization will be adversely affected by lack of performance of a respective job class, and a current level of awareness of a continuity of operations plan;
receive a crisis level indication; and
determine a deployment level for each of the at least two organizations based on the regional response plan and the crisis level indication.

17. The method of claim 7, further comprising identifying at least one barrier limiting additional deployment.

18. The method of claim 17, wherein the at least one barrier limiting additional deployment is at least one of a policy barrier, a cultural barrier, or a technological barrier.

19. The method of claim 17, wherein the component scenario comparison selecting a subset of the proposed scenarios is based at least in part on deployment targets affected by the at least one barrier identified.

20. The method of claim 7, further comprising:
aggregating a regional response plan based on disaster-related data from at least two organizations, wherein the disaster-related data includes a lowest level of working environment to support restoration of each job class, a period of time beyond which an organization will be adversely affected by lack of performance of a respective job class, and a current level of awareness of a continuity of operations plan;
receiving a crisis level indication; and
determining a deployment level for each of the at least two organizations based on the regional response plan and the crisis level indication.

* * * * *